US007724203B2

(12) United States Patent
Shinoda et al.

(10) Patent No.: US 7,724,203 B2
(45) Date of Patent: May 25, 2010

(54) COMMUNICATION SYSTEM, INTERFACE DEVICE, AND SIGNAL CARRYING APPARATUS

(75) Inventors: Hiroyuki Shinoda, Kawasaki (JP); Hiroto Itai, Tokyo (JP); Naoya Asamura, Tokyo (JP); Tetsuro Kiyomatsu, Tokyo (JP)

(73) Assignees: Cell Cross Corporation, Tokyo (JP); The University of Tokyo, Tokyo (JP)

( * ) Notice: Subject to any disclaimer, the term of this patent is extended or adjusted under 35 U.S.C. 154(b) by 152 days.

(21) Appl. No.: 12/066,541

(22) PCT Filed: Sep. 12, 2006

(86) PCT No.: PCT/JP2006/318052
§ 371 (c)(1),
(2), (4) Date: Mar. 12, 2008

(87) PCT Pub. No.: WO2007/032339
PCT Pub. Date: Mar. 22, 2007

(65) Prior Publication Data
US 2009/0179822 A1    Jul. 16, 2009

(30) Foreign Application Priority Data
Sep. 12, 2005  (WO) ................ PCT/JP2005/016718

(51) Int. Cl.
*H01Q 1/36* (2006.01)
(52) U.S. Cl. ..................................... 343/897
(58) Field of Classification Search ............. 343/897, 343/898, 899
See application file for complete search history.

(56) References Cited

U.S. PATENT DOCUMENTS
3,855,598 A * 12/1974 Keller .................. 343/840

(Continued)

FOREIGN PATENT DOCUMENTS
JP    2004-007448    1/2004

(Continued)

OTHER PUBLICATIONS

Two Dimensional Communication Technology for Networked Sensing System, Yasutoshi Makino, Kouta Minamizawwa and Hiroyuki Shinoda, Department of Information Physics and Computing, Graduate School of Information Science and Technology, The University of Tokyo, 7-3-1 Hongo, Bunkyo-ku, Tokyo, 113-8656, Japan, E-mail: {yasutoc, kouta, shino}@alab.t.u-tokyo.ac.jp.

(Continued)

*Primary Examiner*—Tho G Phan
(74) *Attorney, Agent, or Firm*—Howard & Howard Attorneys PLLC

(57) ABSTRACT

A communication system comprises a signal carrying apparatus having a first conductor portion (111) of which external shape is sheet-like and which serves as a conductor and a second conductor portion (121), and an interface device having a first electrode (1211) and a second electrode (1222) located near the first conductor portion (111), the normalized reactance derived from the reactance component of the sheet impedance in the signal carrying apparatus is not extremely smaller than 1, and the normalized distance derived from a distance between the signal carrying apparatus and the interface device made closer to substantially equal to 1 or less for transmitting the electromagnetic field in the leak region (141) between the signal carrying apparatus and the interface device and in the interval region (131) between the external shape of the first conductor portion (111) and the external shape of the second conductor portion (121).

25 Claims, 27 Drawing Sheets

U.S. PATENT DOCUMENTS

| | | | | |
|---|---|---|---|---|
| 3,982,248 A | * | 9/1976 | Archer | 343/840 |
| 4,868,580 A | * | 9/1989 | Wade | 343/912 |
| 6,683,583 B2 | * | 1/2004 | Ngin | 343/897 |
| 7,626,561 B2 | * | 12/2009 | Shinoda et al. | 343/897 |
| 2008/0030424 A1 | * | 2/2008 | Muraoka | 343/897 |
| 2009/0051620 A1 | * | 2/2009 | Ishibashi et al. | 343/897 |

FOREIGN PATENT DOCUMENTS

| | | |
|---|---|---|
| WO | 2007-032339 A1 | 3/2007 |

OTHER PUBLICATIONS

Two-Dimensional Communication Technology Inspired by Robot Skin, Hiroyuki Shinoda, Naoya Asamura, Tachio Yuasa, Mitsuhior Hakozaki, Xinyu Wang, Hiroto Itai, Yastoshi Makino, and Akimasa Okada, Department of Information Physics and Computing, The University of Tokyo, 7-3-1 Hongo, Bunkyo-ku, Tokyo 113-8656 Japan, {shino, asamura, yuasa, hakozaki, wang, yasutoc, okada}@alab.t.u-tokyo.ac.jp.

* cited by examiner

FIG. 1
(a) Plan View
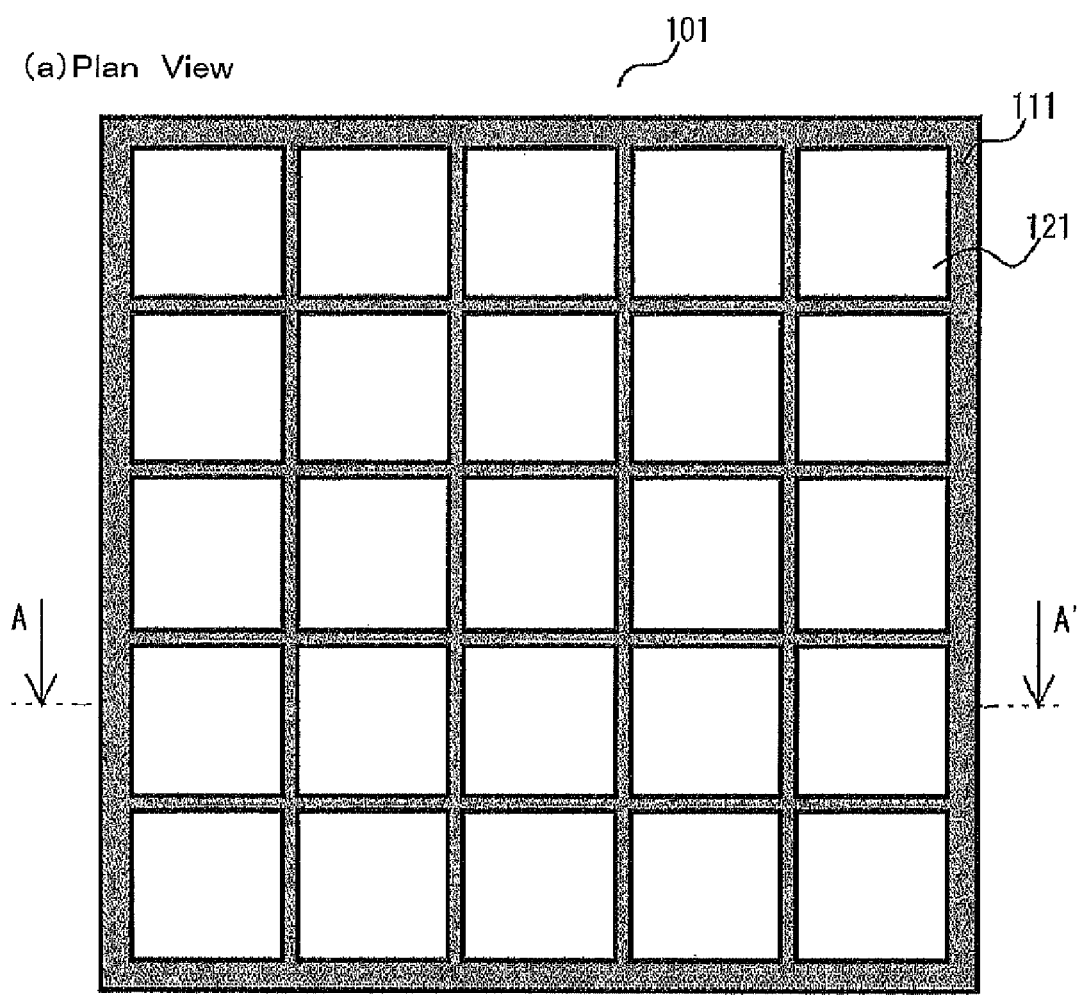
(b) A–A' Cross-Section
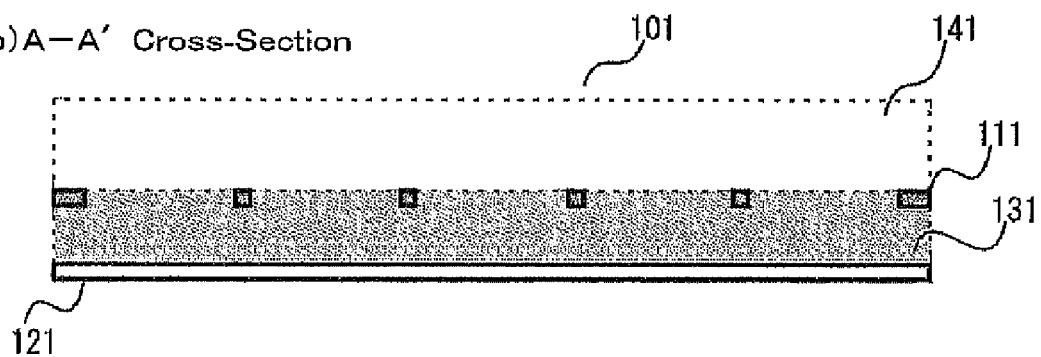

FIG. 15
PRIOR ART
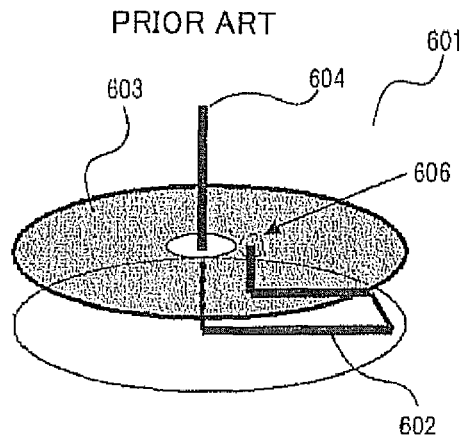
FIG. 16
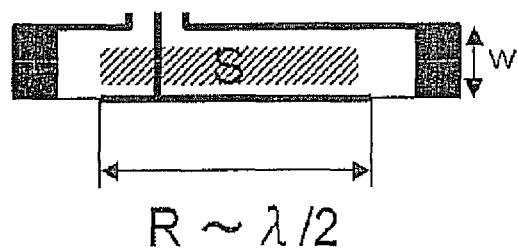
$R \sim \lambda/2$
Current |I| on Proximity Path
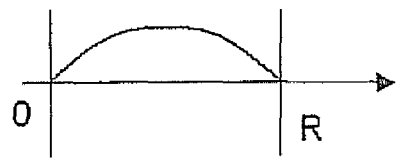
Magnetic Field |B| in Region S
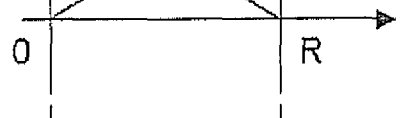
Electric Field E in Region S
(Waveform at a moment where
E is the maximum at the left end.
A phase relationship with I depends
on the coupling of the outside.)

FIG. 20
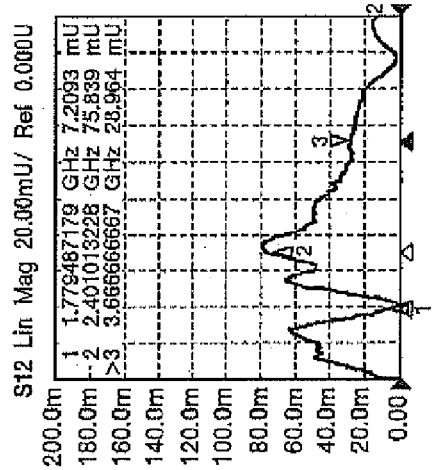
I
$Z = 88.4 - 39.1j\,\Omega$
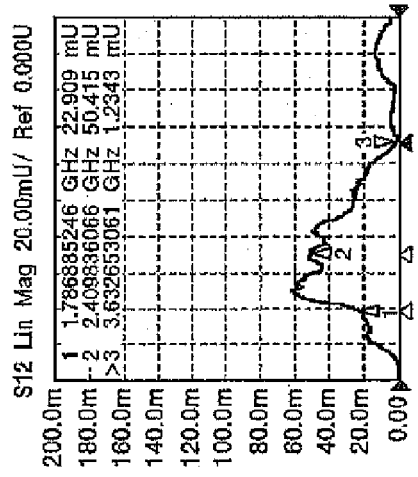
II
$Z = 180.2 + 4.5j\,\Omega$
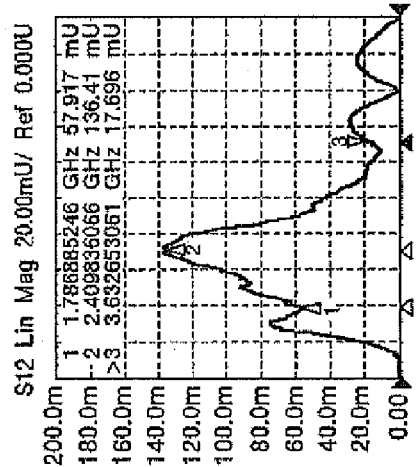
III
$Z = 13.7 + 22.3j\,\Omega$

FIG. 22
PRIOR ART
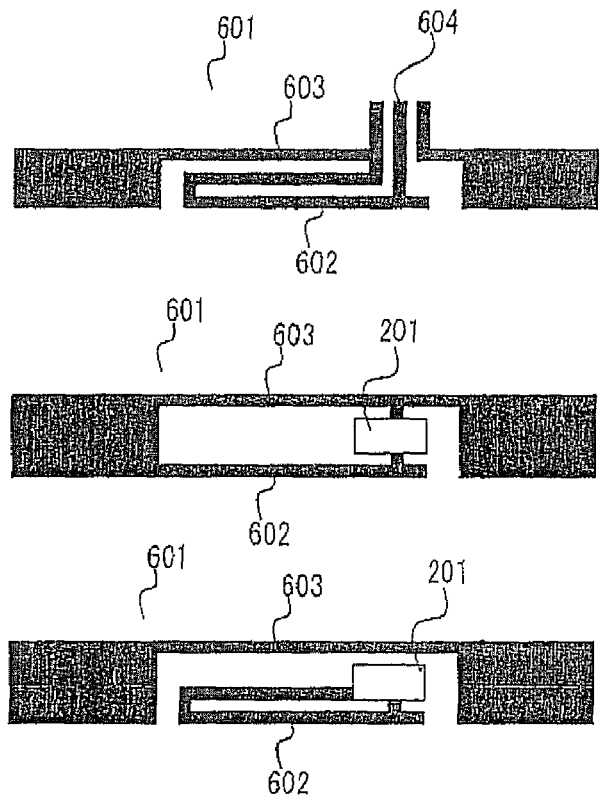
FIG. 23
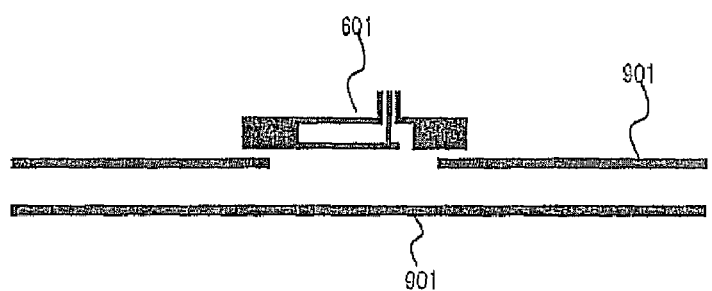
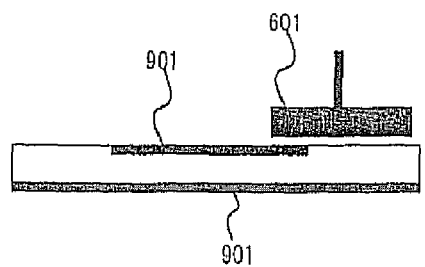

Standardized Distance(H/h) $\varepsilon\_r$ $\gamma$ (Normalized Sheet Reactance)

FIG. 35
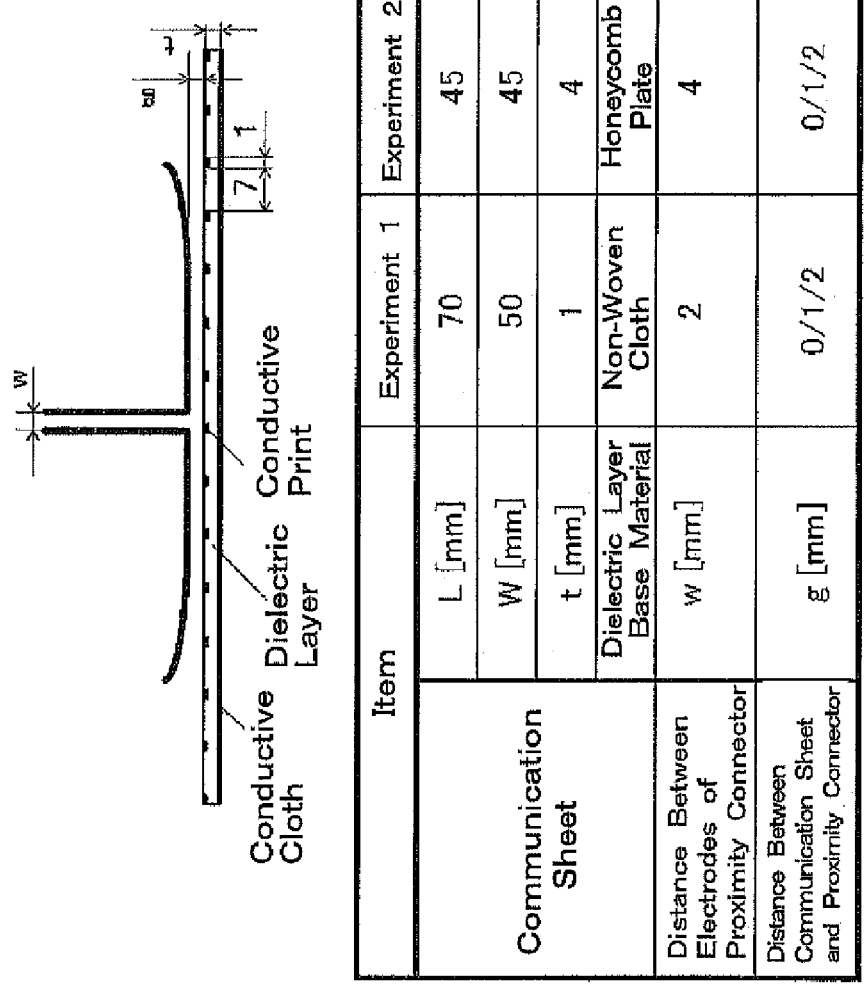
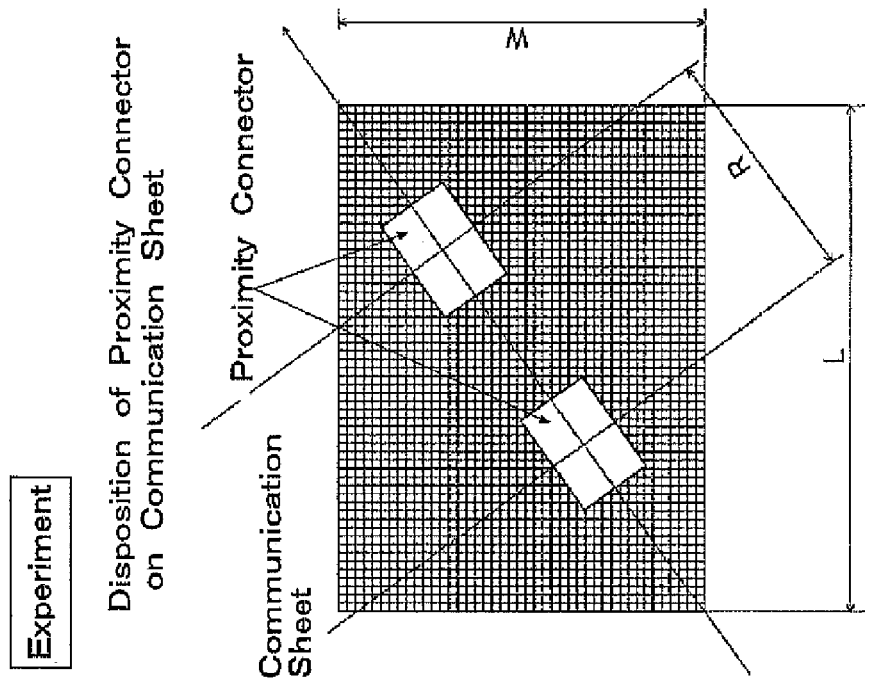

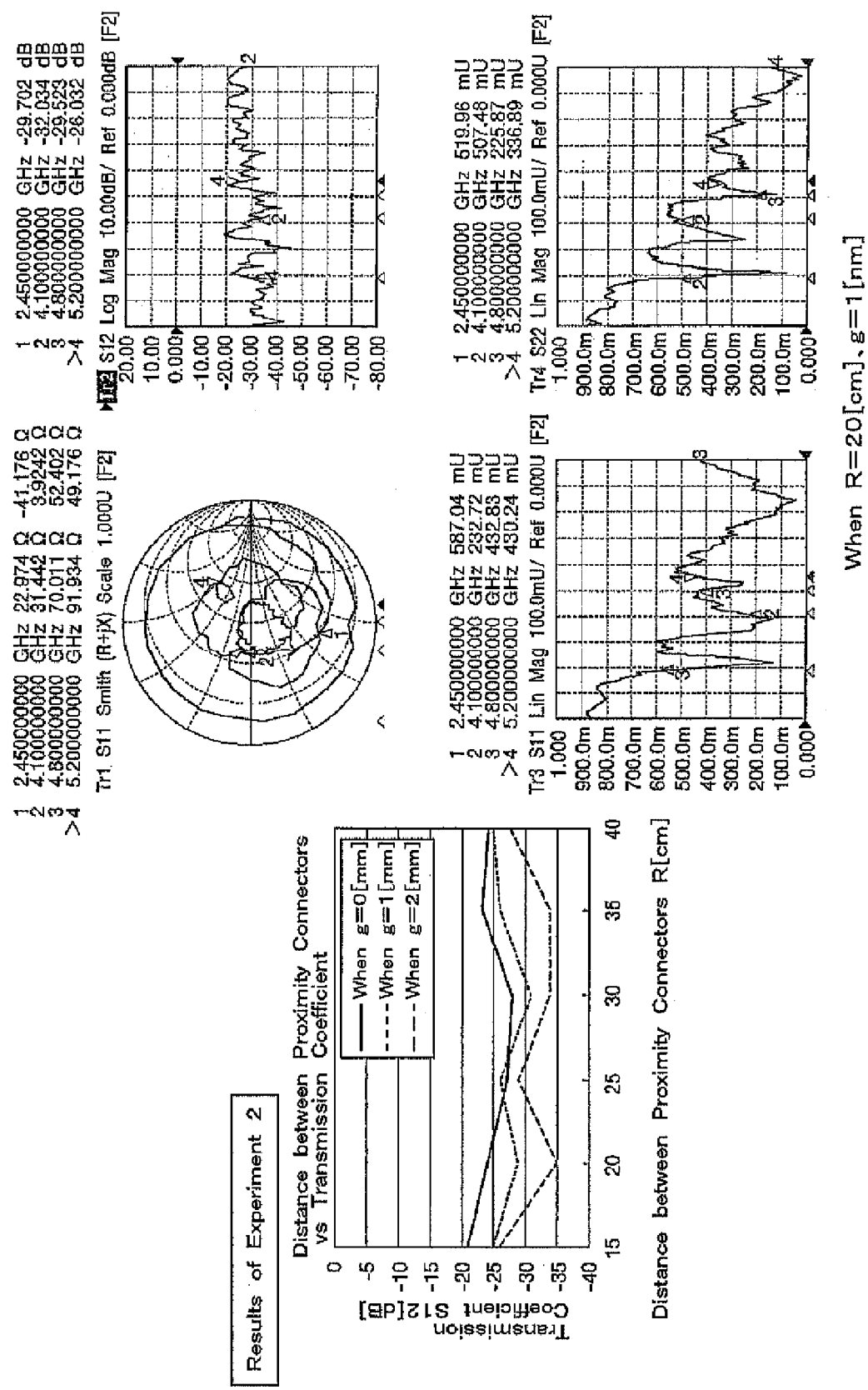

COMMUNICATION SYSTEM, INTERFACE DEVICE, AND SIGNAL CARRYING APPARATUS

CLAIMING PRIORITY

The applicant shall claim the priority based on the International Application PCT/JP2005/16718 (filed on Sep. 12, 2005) pursuant to the Patent Cooperation Treaty in the present patent application and incorporate the contents of the basic application in the present patent application as long as the Act and Regulations in the designated countries permit.

TECHNICAL FIELD

The present invention relates to a communication system, an interface device, and a signal carrying apparatus having a sheet-like shape, wherein an electrode of the interface device is put noncontactly near the signal carrying apparatus in order to efficiently carry a signal.

BACKGROUND ART

Inventors of the present application have been proposing technologies for a sheet-like (cloth-like, paper-like, foil-like, plate-like, film-like, or mesh-like, two-dimensioned as a plane but having a thin thickness) communication device having a plurality of communication elements embedded therein. For example, the following literature discloses a communication device having a plurality of communication elements, embedded in a sheet-like member, hereinafter, a "sheet-like body", relay a signal without individual wirings, thereby carrying the signal.

Patent Literature 1: Japanese Unexamined Patent Application KOKAI Publication No. 2004-007448

According to the technology disclosed in Patent Literature 1, communication elements are disposed at respective vertexes of figures formed in a grid-like shape, a triangular shape, or a honeycomb-like shape on the surface of the sheet-like body. Each communication element utilizes a change in electric potential, which is generated by the communication element and propagates strongly nearby but attenuates distantly, and communicates another communication element.

By successively carrying a signal between individual communication elements through local communications, the signal is carried to a target communication element. The plurality of communication elements are hierarchized by a management function, and path data is set for each hierarchy, so that a signal is efficiently carried to a final-destination communication element.

On the other hand, developed through the research of the inventors is a technology such that an electromagnetic field is generated at an interval region sandwiched between sheet-like bodies facing with each other, and the electromagnetic field is made progress by changing the electromagnetic field through a change in a voltage between the two sheet-like bodies, and by changing the voltage between the sheet-like bodies through a change in the electromagnetic field, thereby performing communication.

To detect a voltage between the two sheet-like bodies, in general, a communication device is directly connected to both sheet-like bodies via wires, and the sheet-like body is provided with a connector which is to be connected to the communication device.

DISCLOSURE OF INVENTION

Problem to be Solved by the Invention

However, if such wired connection is avoided as much as possible and the sheet-like body is made to be capable of transmitting a signal by putting an external communication device close to the sheet-like body, it becomes user-friendly, and the maintenance efficiency becomes improved.

Then, a new technology for coping with such a request is strongly required.

The present invention responds to such a request, and its purpose is to provide a communication system, an interface device, and a signal carrying apparatus, wherein the interface device is put noncontactly near the signal carrying apparatus having a sheet-like shape in order to efficiently carry signals.

Means for Solving the Problem

In order to achieve the above-mentioned object, the below-mentioned invention is disclosed in accordance with the principle of the present invention.

The communication system of a first aspect of the present invention has the sheet-like signal carrying apparatus (101) for carrying a signal by variation of electromagnetic field and the interface device for carrying the signal between the interface and the signal carrying apparatus (101), and is configured as below:

In the first place, the signal carrying apparatus (101) comprises a first conductor portion (111) of which an external shape is sheet-like and which serves as a conductor in the frequency band $\omega/(2\pi)$ of the electromagnetic field; and a second conductor portion (121) of which an external shape is sheet-like and which serves as a conductor in a frequency band $\omega/(2\pi)$ of the electromagnetic field and arranged substantially in parallel with the first conductor portion (111) by being spaced out by a distance h.

On the other hand, the interface device (1201) comprises a first electrode (1211) having a surface located near (opposed to, facing) the first conductor portion (111) and a second electrode (1222) having a surface opposed to the first conductor portion (111) and disposed at a position different from that where the first electrode (1211) is located.

Further, $(\mu_2 \in_2 - \mu_1 \in_1)\omega^2 + X\in_2\omega/h > 0$ is satisfied for normalized sheet reactance $\gamma$ defined as $\gamma = X\in_2/[h\omega(\mu_2\mu_2 - \in_1\in_1)]$, and normalized distance $\eta$ defined as $\eta = H\in_2/(h\in_1)$ for distance H between at least one electrode out of the electrodes and the first conductor portion (111), wherein $\in_2$ is dielectric constant of the interval region (131) between the first conductor portion (111) and the second conductor portion (121), $\mu_2$ is magnetic permeability of the interval region (131), X is reactance component of sheet impedance $\sigma = E_x/I_x = r + jX$ which is the ratio of electromagnetic field $E_x$ in the surface expansion direction of the first conductor portion (111) on the surface thereof to current density $I_x$, $\in_1$ is dielectric constant of the leak region (141) between at least one electrode out of the first electrode (1211) and the second electrode (1222) and the first conductor portion (111) and $\mu_1$ is magnetic permeability of the leak region (141).

And, |γ| is not extremely smaller than 1.

Further, the interface device (1201) and the signal carrying apparatus (101) are put closer to each other so that η is substantially equal to 1 or less to carry the electromagnetic field in the surface expansion direction of the first conductor portion (111) in the frequency band in the leak region (141) and the interval region (131).

In addition, it can be configured such that in the communication system of the present invention, the region opposed to (facing, located near) at least one electrode of the electrodes of the first conductor portion (111) is such that the spatial distribution of the conductor is uneven.

In addition, it can be configured such that in the communication system of the present invention, the first conductor portion (111) includes a meshed conductor.

In addition, it can be configured such that in the communication system of the present invention, the first conductor portion (111) includes a conductive thin film of irregularly-corrugated shape.

In addition, it can be configured such that in the communication system of the present invention, the first conductor portion (111) includes cloth-like woven conductive fibers.

In addition, it can be configured such that in the communication system of the present invention, dielectric is filled in the interval region (131), and the first conductor portion (111) is formed by allowing conductive microparticulates to be mixed in the vicinity of the surface of the filled dielectric.

In addition, it can be configured such that in the communication system of the present invention, the second conductor portion (121) has the same structure as in the first conductor portion (111).

In addition, it can be configured such that in the communication system of the present invention, the interval region (131) is filled with a porous dielectric containing the air.

In addition, it can be configured such that in the communication system of the present invention, the first electrode (1211) and the second electrode (1222) are almost L-shaped ones having a surface which is in an almost vertical direction to the first conductor portion (111) and a surface which is almost in parallel with the first conductor portion (111), the surfaces which are in the almost vertical direction to the first conductor portion (111) of the first electrode (1211) and the second electrode (1222) are opposed (faced, located near) in parallel with each other at a distance w therebetween, the distance between the surfaces which are in almost parallel with the first conductor portion (111) of the first electrode (1211) and the second electrode (1222) and the first conductor portion (111) is gradually increased as they go way from the corners of the L-shaped ones, ν and η are almost the same with relative to normalized distance ν defined as $\nu = w\in_2/(h\in_3)$ to dielectric constant $\in_3$ between the surfaces which are in almost vertical direction to the first conductor portion (111) of the first electrode (1211) and the second electrode (1222).

In addition, it can be configured such that in the communication system of the present invention, the thickness of the interval region (131) is almost the same as the wavelength of the frequency band of the electromagnetic field or less.

In addition, it can be configured such that in the communication system of the present invention, the second conductor portion (121) is affixed onto the wall of a building, an insulator is disposed to cover the second conductor portion (121) in the frequency band of the electromagnetic field, and the first conductor portion (111) is affixed onto the disposed insulator.

In addition, it can be configured such that in the communication system of the present invention, the second conductor portion (121) is a conductor that include the hull of a vehicle, the insulator in the frequency band of the electromagnetic field is disposed to cover the inside of the second conductor portion (121), and the first conductor portion (111) is affixed onto the disposed insulator.

The interface device (1201) of the other aspect of the present invention is the signal carrying apparatus (101) in the afore-mentioned communication system.

The communication system of the other aspect of the present invention is provided with the afore-mentioned signal carrying apparatus (101) and the conductive antenna for receiving the signals transmitted by the signal carrying apparatus (101), and the conductive antenna is disposed closer to a distance from the first conductor portion (111) of the signal carrying apparatus (101) and the distance is not extremely longer than an attenuated distance L defined by $$L=[(\mu_2\in_2-\mu_1\in_1)\omega^2+X\in_2\omega/h]^{-1/2},$$

typically, the distance between the conductive antenna and the first conductor portion is the attenuation distance L or less.

In addition, it can be configured such that in the communication system of the present invention, the signals transmitted by the signal carrying apparatus (101) are supplied from the cables connected in wired connection to the first conductor portion (11) and the second conductor portion (121) in the signal carrying apparatus (101).

EFFECT OF THE INVENTION

The present invention can provide the communication system, interface device, and signal carrying apparatus having a sheet-like shape, wherein the electrodes of the interface device are put noncontactly near the signal carrying apparatus in order to efficiently carry the signals.

BRIEF DESCRIPTION OF DRAWINGS

FIG. 1 is an explanatory diagram showing a schematic configuration of a signal carrying apparatus used in combination with an interface device of a basic relevant technology according to the present invention;

FIG. 15 is an explanatory diagram showing another basic relevant technology of the interface device;

FIG. 16 is an explanatory diagram showing the relationship of the parameters and the conditions of current and magnetic field;

FIG. 20 is each graph showing a receiving power of the other interface device if the orientation of one interface device out of two interface devices to a mesh thereof is varied;

FIG. 22 is an explanatory diagram showing a cross-section of another basic relevant technology of the interface device;

FIG. 23 is a cross-section showing a relationship between the interface device and a signal carrying apparatus of the other embodiment connectable thereto;

FIG. 35 is an explanatory diagram showing the data of the experiment in communication performance of the signal carrying apparatus and the interface device;

DESCRIPTION OF REFERENCE NUMERALS

Figure 2:
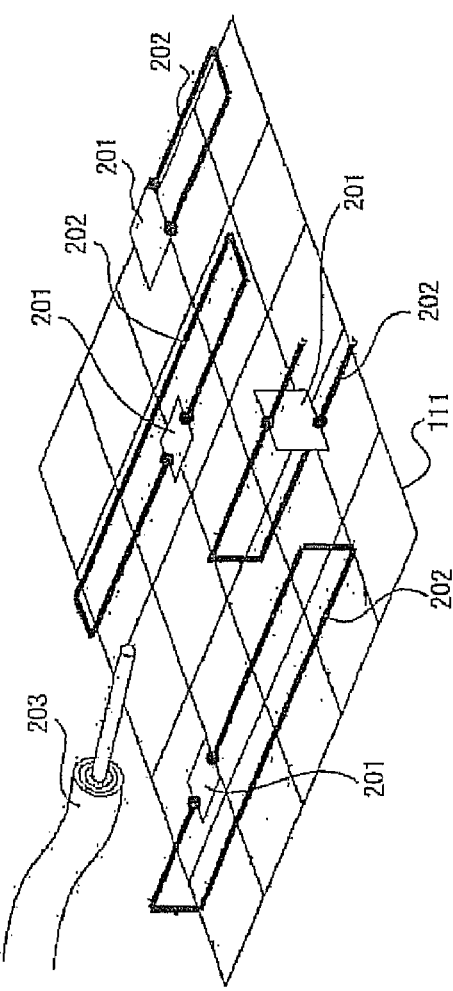
FIG. 2 is an explanatory diagram showing the condition of the interface device of the simplest shape for the signal carrying apparatus of the basic relevant technology.

101 Signal Carrying Apparatus
111 First Conductor Portion
121 Second Conductor Portion
131 Interval Region
141 Leak Region
151 Opposite Region
201 Communication Circuit
202 Loop Antenna
203 Bipolar Antenna
601 Interface Device
602 Internal Conductor Portion
603 External Conductor Portion
604 Path Conductor Portion
605 Insulator Portion
606 Connection Point
901 Conductor Plate
902 Coaxial Cable
903 Junction Portion
904 Striped Conduction Portion
1201 Interface Device
1211 First Electrode
1218 Coaxial Cable
1222 Second Electrode
1231 Communication Device

BEST MODE FOR CARRYING OUT THE INVENTION

The embodiment of the present invention is described below. In addition, the description of the embodiment is for explanation purpose only, and does not limit the scope of the present invention. Therefore, those who are skilful in the art can adopt embodiments where each factor or all the factors thereof are replaced with new ones which are equal to those in the present invention. However, these embodiments are also included in the scope of the present invention.

The planar shaped, sheet-like signal carrying apparatus and the interface device for receiving and sending signals by allowing the interface device to be put close to the signal carrying apparatus are sequentially described below.

For easier understanding, a conductor which serves as a conductor in a frequency band of electromagnet field used for a signal carrying is hereinafter referred to as "a conductor" and a dielectric which serves as a dielectric in the frequency band is hereinafter referred to as "a dielectric". Therefore, for example, a matter which is an insulator to direct current may be referred to as "a conductor".

Embodiment 1

Basic Relevant Technology of Signal Carrying Apparatus

FIG. 1 is an explanatory diagram showing a schematic configuration of the signal carrying apparatus of the technology. Below, the description is provided with reference to the diagrams.

The diagram (b) is a cross-section of the signal carrying apparatus 101 of the technology. As shown in the diagram, the signal carrying apparatus 101 is provided with the meshed first conductor portion 111 and the planar second conductor portion 121 substantially in parallel therewith.

Here, a region between the first conductor portion 111 and the second conductor portion 121 is the interval region 131, and a region on the first conductor portion in the diagram is the leak region 141.

The diagram (a) is a plan view of the signal carrying apparatus 101. The first conductor portion 111 of the technology is of a mesh of squares, and the second conductor portion is seen through the inside squares.

In addition, the repeated unit of mesh is equal to the distance between the centers of these squares that are horizontally adjacent to each other and it is almost equal to the length of one side of the square.

In the technology, the interval region 131 and the leak region 141 are filled with the air. However, any or both of them may be of various kinds of dielectrics, or water, soil, or vacuum.

The external shapes of the first conductor portion and the second conductor portion are each sheet-like (cloth-like, papyraceous, foil-like, planar, membranous, film-like, mesh-like and the like, which extend as a plane and the thicknesses of which are each small).

Therefore, for example, if the wall of a chamber is used as the signal carrying apparatus of the technology, a conductor of metal foil, metallic mesh or the like is first affixed as the second conductor portion 121, an insulator is next sprayed, the metallic mesh is affixed as the first conductor portion 111, and a wall paper of insulator may be further affixed. In addition, if the wall of a vehicle is used as a signal carrying apparatus, a metallic wall of the hulls may be used as it stands as the second conductor portion 121.

Then, the focus will be on a mode of the electromagnetic wave propagating in the interval region 131 between the first conductor portion 111 and the second conductor portion 121 in the signal carrying apparatus 101.

If the first conductor portion 111 is not of mesh, and is of a foil-like structure without aperture, the electromagnetic wave is completely contained in the interval region 131.

However, the first conductor portion 111 has a meshed structure with apertures. In such a shape where the distribution of a conductor is uneven, the electromagnetic wave is liable to leak. A region where the electromagnetic wave leaks is the leak region 141.

The height (thickness) of the leak region 141 varies with the shape, size or the like of an external conductor that is put close to the first conductor portion 111. However, if a conductor is not provided outside, the strength of the electromagnetic wave is liable to exponentially attenuate in accordance with a distance from the surface of the first conductor portion 111.

For example, if the size of the external conductor is around the size of the repeated unit of meshes or is smaller than it, the electromagnetic wave is able to coupled with a mode that propagates a communication sheet by allowing the external conductor to be put closer to a distance almost equal to the repeated unit of meshes.

On the other hand, if the external conductor is sufficiently larger than the repeated unit of meshes and the like, the ratio of the electromagnetic energy absorbed between the meshes and the external conductor in the leak region 141 varies with the distances between the two. In this case, a distance at which the electromagnetic energy of a significant level of quantity can be absorbed can be determined by the "normalized distance" described later.

A description is suitably added below as to cases where various kinds of interface devices are adopted as external conductors.

FIG. 2 is an explanatory diagram showing the interface device of the simplest shape, for the signal carrying apparatus of the technology. the diagram shows the condition that communications are performed between the interface device and the signal carrying apparatus by adopting a loop antenna or a dipolar antenna as the interface device. It is described with reference to the diagram below.

The diagram shows four combinations of the communication circuit 201 that performs sending/receiving with the loop antenna 202 connected to the communication circuit, in the leak region 141 present on the surface of the meshed first conductor portion 111.

It is preferable that the length of the loop antenna 202 is almost half of the length of the electromagnetic wave transmitted by the signal carrying apparatus 101. However, even if it is larger or smaller than this one, communications are possible.

The diagram shows a case where a loop antenna 202 is vertically disposed on the surface of the first conductor portion 111 and another case where a loop antenna 202 is disposed in parallel with the surface of the first conductor portion 111.

In addition, the diagram shows a case that both ends of the horizontally set U-shaped loop antenna 202 are terminated by the communication circuit 201 and the antenna is disposed in parallel with the surface of the first conductor portion 111.

Furthermore, the diagram shows a case that the horizontally set U-shaped loop antenna 202 is connected to the communication circuit 201. where its ends are further extended up to the opposite side of the communication circuit 201 and it is vertically disposed on the surface of the first conductor portion 111.

In addition to the aforementioned, the interface device using the antenna 203 where the core wire of a coaxial cable is merely exposed is also illustrated. In this case, it is possible to receive/send the electromagnetic wave between the communication device connected to the coaxial cable and the signal carrying apparatus 101 by putting the core wire of the antenna 203 close to the first conductor portion 111.

It is possible to perform communications between these communication circuits 201 or between the communication device connected to the coaxial cable and the communication circuit 201 through the signal carrying apparatus 101. In addition, though it is not shown in the diagram, it is also possible to perform communication with the communication device if the system has a communication device wiredly connected directly to the first conductor portion 111 and the second conductor portion 121. Thus, communications are possible between any of 1 versus 1, 1 versus N, N versus 1, N versus N.

Further, the device can be also used as a tag read-out device using a circuit of RFID tag as the communication circuit 201, furthermore a sensor can be also mounted thereon. In addition, there also is a form of the usage that an external device is connected to the communication circuit by wiring, or the antenna is connected to a coaxial cable for connection to an external device through the coaxial cable in place of being connected to the communication circuit.

In addition, it is also possible to supply an electric power with a micro wave to charge the interface device side.

Figure 3:
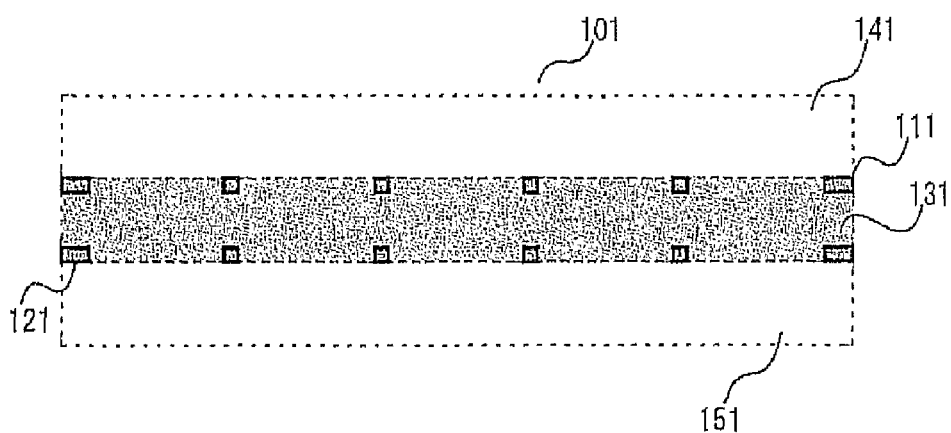
FIG. 3 is an explanatory diagram showing a schematic configuration of the signal carrying apparatus used in combination with the interface device of the basic relevant technology according to the present invention.

In addition, in the afore-mentioned technology, the second conductor portion 121 is determined to be a foil-like conductor without any aperture. However, the second conductor 121 may be of a mesh as in the first conductor portion 111. FIG. 3 is a cross-section of such a configuration.

As shown in the diagram, the opposite region 151 that is similar to the leak region 141 is presented also outside the second conductor portion 121 and the electromagnetic wave also leaks here. Therefore, because the electromagnetic wave leaks on both of the front and the back side, it is possible to receive the signals if the interface device is put close to any of the surfaces.

Then, a theoretical background of such a leak region 141 is briefly described below. In the signal carrying apparatus 101 of such a configuration as above, the mode $\phi_n$ of the electromagnetic wave propagating without "radiating" electromagnetic wave outside the signal carrying apparatus 101 is existent in the interval region 131 (and the leak region 141 and opposite region 151 that are in the vicinity thereof).

Here, the height L of a near-field where the electromagnetic field strength comparable with that of the interval region 131 leaks causing no far-field radiation is about $d/(2\pi)$, for the repeated unit length of meshes d, particularly, where no conductor is adjacent thereto.

Here, the amplitude of the electromagnetic wave that leaks attenuates approximately as represented by $e^{-z/L}$ where a distance from the surface of the first conductor portion 111 or the second conductor portion 121 is z in the leak region 141 or the opposite region 151, respectively.

Therefore, the interface device is disposed in the range of the distance L from the first conductor portion 111 (or the second conductor portion 121) to induce the $\phi_n$ to perform signal carrying. In addition, the range may be about the length d in place of the distance L, depending upon the sensitivity of the interface device. Namely, it can be considered that the thickness of the leak region 141 (or the opposite region 151) is about L to d.

Figure 4:
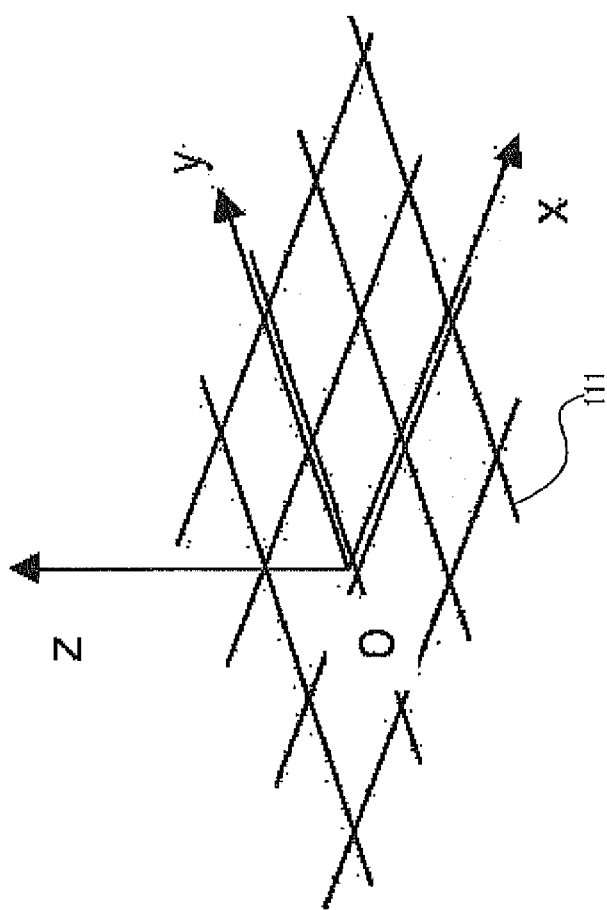
FIG. 4 is an explanatory diagram showing a coordinate system used to analyze the signal carrying apparatus.

It is further considered in detail below. FIG. 4 is an explanatory diagram showing the condition of the coordinate system used to analyze the signal carrying apparatus 101. It is described with reference to the diagram below.

As shown in the diagram, it is assumed that the meshed first conductor portion 111 where the repeated unit length is d is disposed at z=0 and the second conductor portion 121 is disposed at z=−D. Then, it is assumed that other than the first conductor portion 111 and the second conductor portion 121 are filled with dielectrics of dielectric constant ∈. It is assumed that a mesh is a mesh of squares. The original point is superposed upon the mesh intersection, and the x axis and the y axis are in parallel with the meshes.

Then, electromagnetic energy is locally present in the vicinity of the meshes, the traveling wave solution in the form of $E_z=Af(x, y, z)\exp(-j(xk_x+yk_y))$ with respect to electric field E out of the electromagnetic field. Here, $E_z$ is the z component of the electric field, A, $k_x$, and $k_y$ are each constant, and f(x, y, z) is a function having a cycle d in the x direction and the y direction, $k=(k_x, k_y, 0)$ is a wave vector (propagation vector) showing the traveling direction of the traveling wave. Even other electromagnetic field components can be written in the similar form thereto.

That is, f(x+d, y, z)=f(x, y, z)=f(x, y+d, z) is established for arbitrary x, y, and z, of any number.

Then, the electromagnetic field including $E_z$ meets the wave equation:

$$\Delta E_z = -(\omega^2/c^2)E_z$$

in the dielectric and $k_x^2+k_y^2 \approx$ (nearly equal) $\omega^2/c^2$.

In addition, the wave number k in the present invention of the patent application is described later.

Here, if an attention is paid to the electromagnetic field at z>0, the following Fourier expansion of f is possible in accordance with the cyclicality of f:

$$f(x,y,z)=\Sigma_{m,n}a(m,n)\exp(2\pi jmx/d)\exp(2\pi jny/d)g(m,n,z)$$

wherein, m and n are each integer.

If d is sufficiently smaller than the wavelength λ of the electromagnetic wave, $2\pi/d$ is sufficiently larger than ω/c, and (m,n)≠(0,0), the component:

$$u(m,n)=\exp(2\pi jmx/d)\exp(2\pi jny/d)g(m,n,z)$$

approximately meets $\Delta u=(-(2\pi m/d)^2-(2\pi n/d)^2+\partial^2/\partial z^2)u=0$, that is, $\partial^2/\partial z^2 g \approx (2\pi)^2(m^2+n^2)/d^2 g$ from the independency of each component of Fourier expansion. Therefore, g(m, n, z)≈B exp($-2\pi(m^2+n^2)^{1/2}z/d$) is satisfied. where B is a constant. Therefore, the attenuation length of the component (m,n)≠(0,0) is $d/(2\pi)$ or less.

Here, the component of (m,n)≠(0,0) corresponds to the component of the traveling wave modulated with the cycle of the meshed structure.

The component corresponding to (m,n)=(0,0), that is, the component of the traveling wave that is not modulated with the cycle of the meshed structure is given by $E_z$ described later (in the embodiment in the present invention of the patent application). The attenuation length of the electromagnetic field and the like are also described later.

Against such a theoretical background, the product of 4π∈ and vertical electric field $E_z$ [V/m] generated when the first conductor portion 111 is determined to be a mesh-shaped conductor with square meshes of d=2 [mm], the second conductor portion 121 is determined to be a foil-like conductor, and mean line charge density σ=0.001 [C/m] is given to the first conductor portion 111 is obtained.

As in the afore-mentioned, the first conductor portion 111 is disposed at z=0 and the second conductor portion 121 is disposed at z=−D. The original point is superposed upon the mesh intersection, and the x axis and the y axis are in parallel with the meshes.

Figure 5:
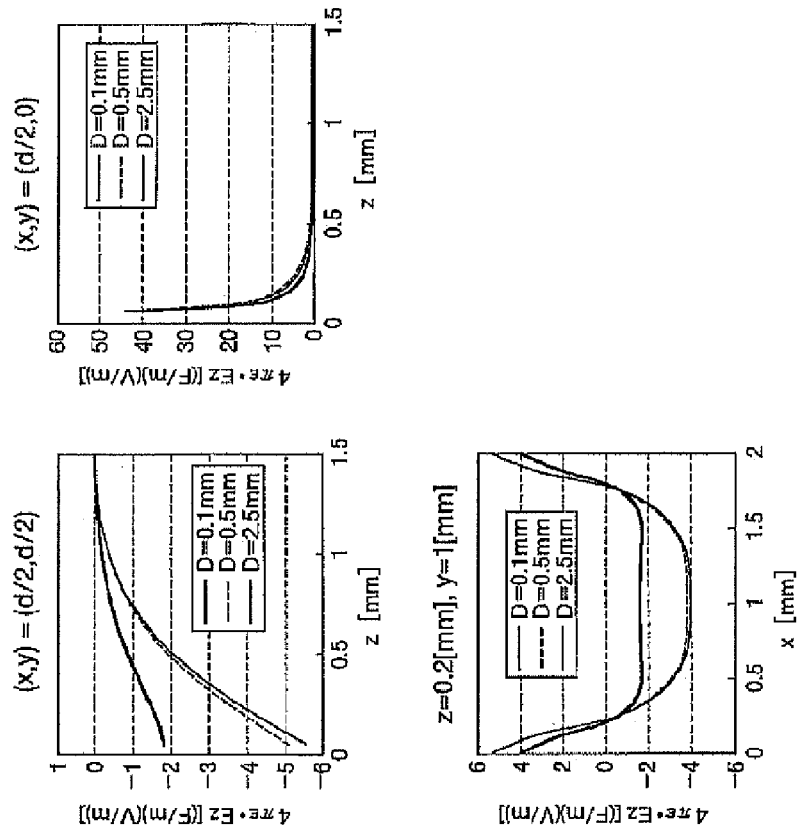
FIG. 5 is an explanatory diagram showing the strength of a vertical electric field at various places in the signal carrying apparatus.

FIG. 5 is an explanatory diagram showing the strengths of the vertical electrical fields at various places in the signal carrying apparatus in this case. It is described with reference to the diagram below. In addition, the contribution of the term of (m, n)=(0, 0) is excluded in the diagram.

As shown in three graphs in the upper row of the diagrams, it is understood that the vertical electrical field becomes almost 0 from the vicinity of z=1 [mm] in any of (x,y)=(0,0), (x,y)=(d/2,d/2), (x,y)=(d/2,0). In addition, the vertical electrical fields at y=1 [mm] and z=0.2 [mm] each become a cyclic pattern as shown in one graph in the lower row of the diagram.

Thus, because the leak of the electromagnetic field may be about 1 mm when the repeated unit length of the meshes is 2 mm, the coupling between electromagnetic field around the mesh may become possible to transmit and receive the signals if the interface device having a size of the structure comparable with the mesh cycle is put closer to the meshes in the distance or less.

In addition, the electrical field distribution in the case where the mesh structure of the second conductor portion 121 disposed at z=−D is the same as in the first conductor portion 111 disposed at z=0 is the same distribution as in the case where the foil-like second conductor portion 121 is disposed at z=−D/2 and the meshed first conductor portion 111 is disposed at z=0, in accordance with the principle of symmetry. Therefore, a similar conclusion to the afore-mentioned is obtained.

Thus, an order of about $d/(2\pi)$ to $d/2$ or $d$ is considered as the thickness of the leak region 141 or the opposite region 151 in coupling with an interface of the size comparable with the mesh cycle, and communications can be performed by "dipping" the interface device into the leak region 141 or the opposite region 151.

In addition, the mesh needn't to be inevitably a repetition of squares and may be also a mesh of various polygons. In addition, the unit of meshes needn't to be inevitably limited to the same shape, and may be of different shapes if it is of appropriate meshes. In this case, the value corresponding to the afore-mentioned d is the average of the sizes of each mesh. In addition, it can be also considered that the cycle is d if a basic cycle, d, is existent.

Besides the afore-mentioned, a portion where a plurality of punched circular holes are arranged in a honeycomb form in a planar, sheet-like conductor may be used as the first conductor portion 111. In this case, the distances between the centers of circles are equivalent to the afore-mentioned d.

(Basic Relevant Technology of Interface Device)

In the afore-mentioned description, the loop antenna 202 or the dipolar antenna 203 is used in the interface device. Below, an interface device such that electromagnetic field having directivity can be radiated is proposed below.

It is preferable that the interface device proposed here is used in a combination with the afore-mentioned signal carrying apparatus 101. However, if it can contact the electromagnetic field that transmits the signals, communications are possible. Therefore, aspects that the interface device is used are not limited to the combination with the afore-mentioned signal carrying apparatus.

Figure 6:
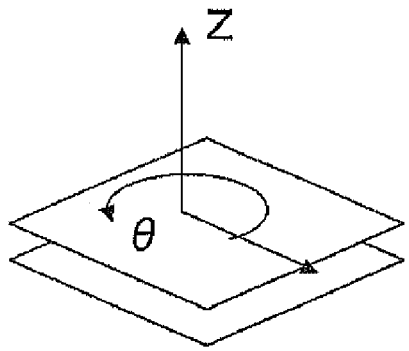
FIG. 6 is an explanatory diagram for explaining the directivity of an electromagnetic field.

FIG. 6 is an explanatory diagram for explaining the directivity of such an electromagnetic field. It is described with reference to the diagram.

As shown in the diagram, if it is assumed that an angle around the z axis vertically set to the first conductor portion 111 and the second conductor portion 121 in the signal carrying apparatus 101 is θ, the electromagnetic field $\phi_1$ radiated by the interface device of the technology is as follows:

$$E_z \approx e(r,z)\cos\theta;$$

$$B_\theta \approx b(r,z)\cos\theta;$$

wherein, $r^2=(x^2+y^2)$ if it is assumed that the electromagnetic field in the z direction is $E_z$ and the magnetic field component in the counterclockwise direction of the z axis is $B_\theta$.

Figure 7:
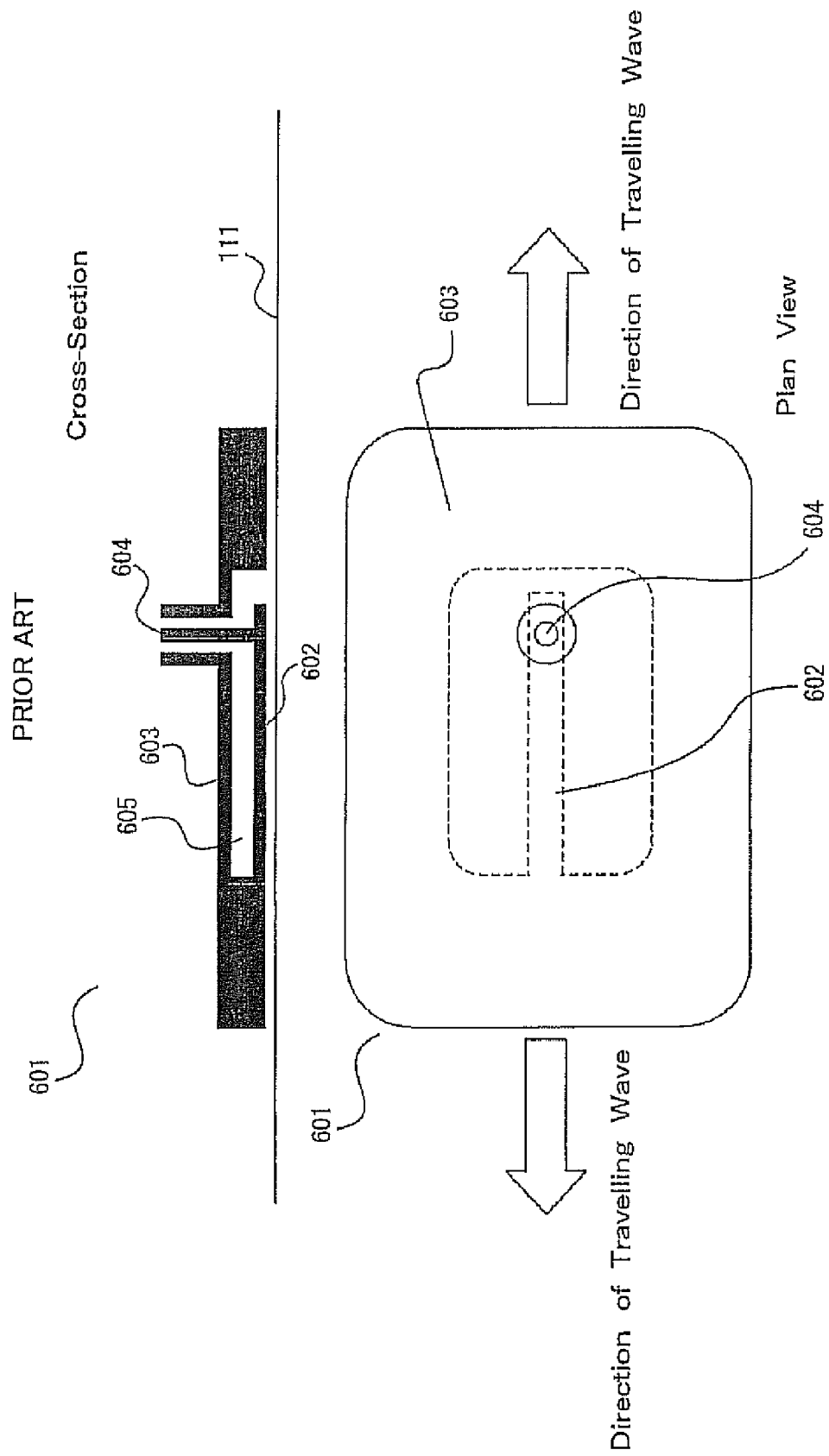
FIG. 7 is an explanatory diagram showing a schematic configuration of the basic relevant technology of the interface device having directivity.

FIG. 7 is an explanatory diagram showing a schematic configuration of one technology of the interface device having such directivity. It is described with reference to the diagram below.

The interface device 601 can be roughly divided into the internal conductor portion 602, the external conductor portion 603, and the path conductor portion 604.

The internal conductor portion 602 is a conductor that is put close to the signal carrying apparatus 101, is of a strip-like shape of width t, and where one end is connected to the external conductor portion 603 and the other is connected to the path conductor portion 604, respectively.

The external conductor portion 603 has a box-like structure covering the internal conductor portion 602. An aperture is provided in the external conductor portion 603 and the path conductor portion 604 passes through the aperture noncontactly.

This allows a current path of the external conductor portion 603 to the internal conductor portion 602 to the path conductor portion 604 to be established. Then, the coaxial cable or the signal sending/receiving circuit is coupled with the external conductor portion 603 and the path conductor portion 604 in the vicinity of the aperture of the external conductor portion 603, and if the current flowing here is varied, the electromagnetic wave is mainly radiated in the directions of the arrows in the diagram.

Thus, electromagnetic energy can be efficiently sent/received between the interface device and the signal carrying apparatus 101, because a useless electromagnetic radiation outside the interface device 601 can be prevented by the external conductor portion 603 covering the internal conductor portion 602 and the path conductor portion 604.

In addition, portions other than the external conductor portion 603, the internal conductor portion 602, and the path conductor portion 604 may be filled with dielectric. In addition, Only the surfaces with the depths as large as the skin depth of the external conductor portion 603, the internal conductor portion 602, and the path conductor portion 604, should be conductors and each of their internal materials may be arbitrary ones.

It is desirable that the mutually opposed surfaces of the external conductor portion 603 and the internal conductor portion 602 are in parallel and the internal conductor portion 602 is also of a planar strip. Steps and irregularities may be allowable.

It is desirable that t is not extremely larger than w if a distance between the mutually opposed surfaces of the external conductor portion 603 and the internal conductor portion 602 is assumed as w. Namely, it is desirable that t is comparable with w, not extremely larger than w and smaller than w.

Figure 8:
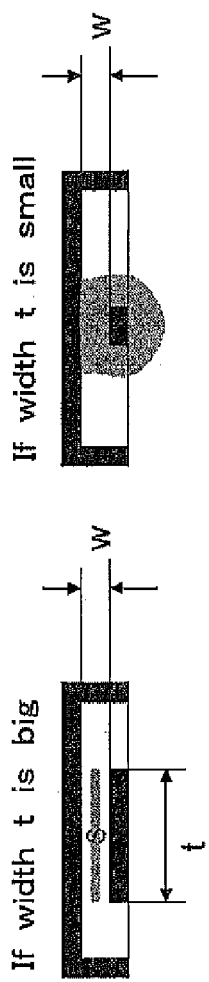
FIG. 8 is an explanatory diagram showing a relationship between t values and w values in the interface device.

FIG. 8 is an explanatory diagram showing a relationship between t and w in the interface device 601. It is described with reference to the diagram.

If t is comparable with w or less, the electromagnetic field generated by allowing the current to flow in the internal conductor portion 602 is also generated outside the interface device 601 (the hatched region on the right in the diagram), and the electromagnetic field is combined with the traveling wave mode of the signal carrying apparatus 101, thereby enabling the system to induce the traveling wave.

On the other hand, if t becomes larger to cover the entire bottom of the interface device 601, sending/receiving the signals can not be performed at all.

However, if a clearance is opened at a part of the bottom, a coupling with the traveling wave mode of the interval region 131 in the signal carrying apparatus 101 occurs. Then, when impedance matching is performed with the cable or the communication circuit that drives the interface device 601, there is also considered a case that t is made larger than w to decrease impedance when the inside of the interface device 601 is viewed from the aperture of the external conductor portion 603 (which is a juncture portion between the cable and the interface device 601).

However, in this case, the ratio of the energy accumulated in the hatched region S on the left hand in the diagram to the electromagnetic energy generated outside the interface device 601 becomes large, thus extra energy loss would occur due to the first conductor portion 111 exposed to region S and the dielectric loss in the region S.

Figure 9:
FIG. 9 is an explanatory diagram showing a general shape of the side of an internal conductor portion connected to a path conductor portion.

Therefore, it is possible to adopt a method wherein, t itself is not enlarged, and impedance matching is achieved by allowing the internal conductor portion 602 to comprise a plurality of thin bands. FIG. 9 is an explanatory diagram showing a general shape of the side to be connected to the path conductor portion 604 in the internal conductor portion 602 in such a case.

As shown in the diagram, the internal conductor portion 602 is of a fork-like shape and, it is configured such that a plurality of thin bands are extended from the path conductor portion 604 and are connected to the external conductor portion 603 (not illustrated in the diagram).

In addition, it is desirable that $2\pi R$ is not extremely smaller than $\lambda$ where R is the length of the internal conductor portion 602 (the distance between the point where the internal conductor portion 602 is connected to the external conductor portion 603 and the point where the internal conductor portion 602 is connected to the path conductor portion 604 is R−m) and $\lambda$ is the wavelength of the electromagnetic field.

Here, $\lambda$ is the wavelength $2\pi/(k_z^2+k_y^2)^{1/2}$ of the traveling wave in the signal carrying apparatus 101.

Supposing that $2\pi R \ll \lambda$ is established, the ratio of energy loss (caused by the dielectric loss in the surroundings of the interface device and by the resistance of metals) at the time when the electromagnetic wave is transmitted to the signal carrying apparatus 101 becomes large, since the ratio of energy density that is radiated in a distance significantly becomes small to the electromagnetic energy density locally generated in the vicinity of the current path.

By the way, the interface device 601 of such a general shape can be connected to the aforementioned signal carrying apparatus 101 and can be also connected to a signal carrying apparatus wherein two sheet-like conductors are opposed and an aperture is locally provided and a signal carrying apparatus wherein a sheet-like dielectric is affixed onto one sheet of sheet-like conductor. Therefore, the interface device 601 can be applied to various signal carrying apparatuses.

The electromagnetic field generated by the interface device 601 is further described in detail below.

Figure 10:
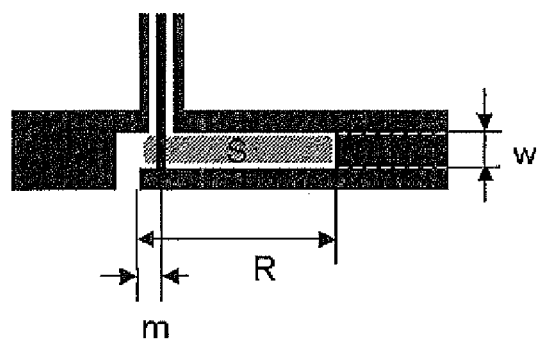
FIG. 10 is an explanatory diagram showing parameters of the shape of the interface device.

FIG. 10 is an explanatory diagram showing the parameters of the shape in the interface device 601. They are described with reference to the diagram.

It is assumed that the length of the internal conductor portion 602, hereinafter suitably referred to as "proximity path", is R, the distance between the internal conductor portion 602 and the external conductor portion 603 is w, and the length of the internal conductor portion 602 that is further extended over the connection point with the path conductor portion 604 is m.

Figure 11:
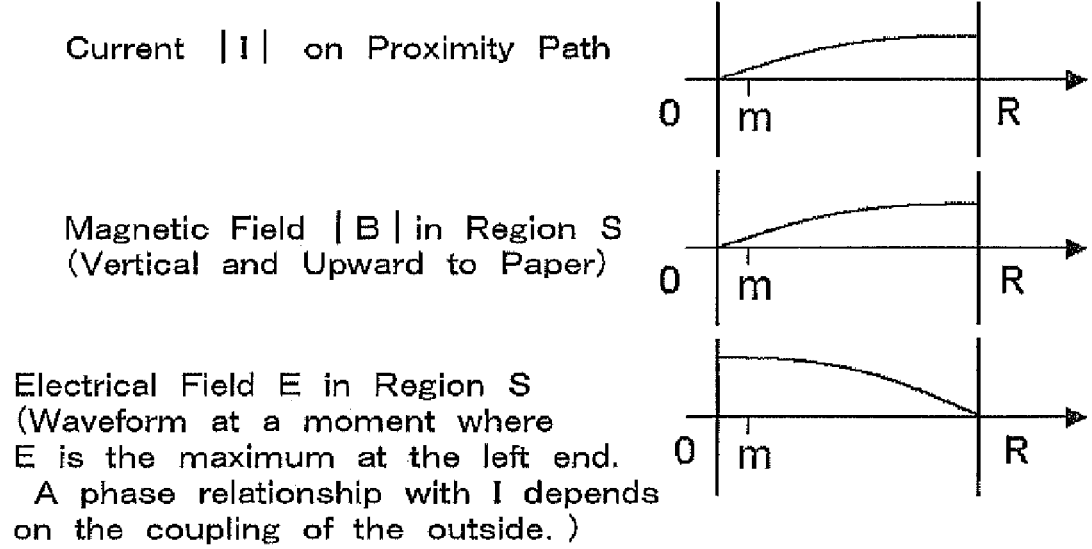
FIG. 11 is an explanatory diagram showing the condition of an electromagnetic field generated in a region in the vicinity of the internal conductor portion.

FIG. 11 is an explanatory diagram showing the condition of the electromagnetic field generated in the region S in the vicinity of the internal conductor portion 602 under such conditions.

R, m, w, and t are controlled so as to allow the impedance of the coaxial cable connected to the interface device 601 and the impedance in the case where the inside of the interface device 601 is viewed from the portion to which the coaxial cable is connected to be closer to each other. Here, there is a place where the reactance component of the impedance is zero-crossed when $R \approx \lambda/4$. Then, the length R is set at the place where the reactance component is zero-crossed.

Next, m, t, and w are simultaneously controlled so as to allow the real part of the impedance to be equal to the impedance of the coaxial cable.

Figure 12:
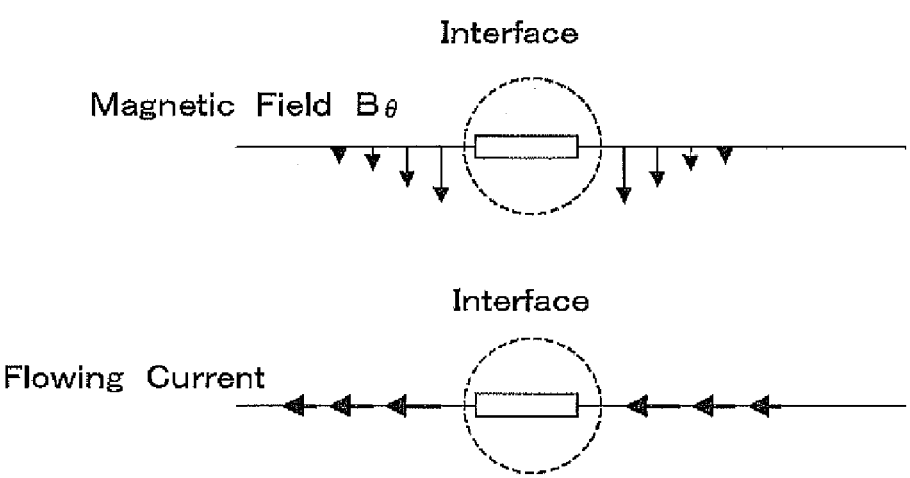
FIG. 12 is an explanatory diagram showing the condition of the electromagnetic field in φ1 mode.

The electromagnetic field in such a $\phi_1$ mode is supposed to be generated. FIG. 12 is an explanatory diagram showing the electromagnetic field in the $\phi_1$ mode. It is described with reference to the diagram below.

The rectangles shown in the upper and lower rows of the diagram represent the internal conductor portion 602. In addition, the external conductor portion 603 is of a circular shape shown with the dashed lines.

The upper row of the diagram shows the distribution with regard to the magnetic field $B_\theta$ inside the signal carrying apparatus 101 in the direction of $\theta=0, 180°$. The distribution of another direction is of a shape that the distribution in the diagram is multiplied by $\cos \theta$ times. In addition, although the component $B_r$ along the radius vector is also existent in the magnetic field in the vicinity of the center, it does not play a major role in the present invention.

The current flowing in the first conductor portion 111 inside the signal carrying apparatus 101 is shown. Thus, it is rather convenient because the electromagnetic wave can be radiated by merely inducing the current in one direction.

That is, the electromagnetic field generated by the interface device 601 of the technology is strongly correlated with the electromagnetic field in an asymmetric $\phi_1$ mode, and the electromagnetic field is radiated by merely inducing the magnetic field or the current in one direction in the vicinity of the signal carrying apparatus 101. Therefore, it is well coupled with the electromagnetic field in the signal carrying apparatus 101 generated by the interface device 601 of the technology.

Figure 13:
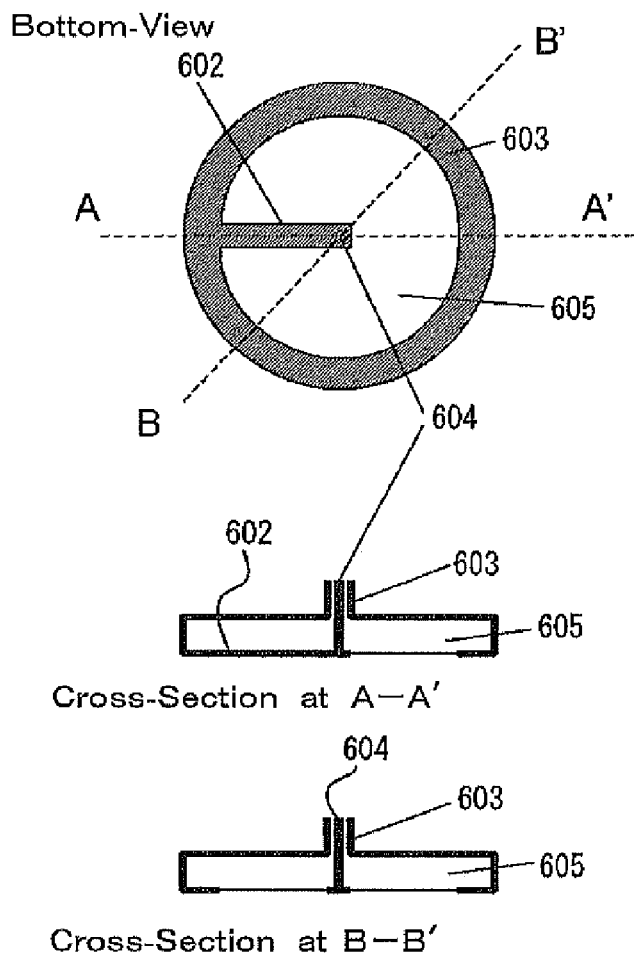
FIG. 13 is an explanatory diagram showing a schematic configuration of a circular interface device.
Figure 14:
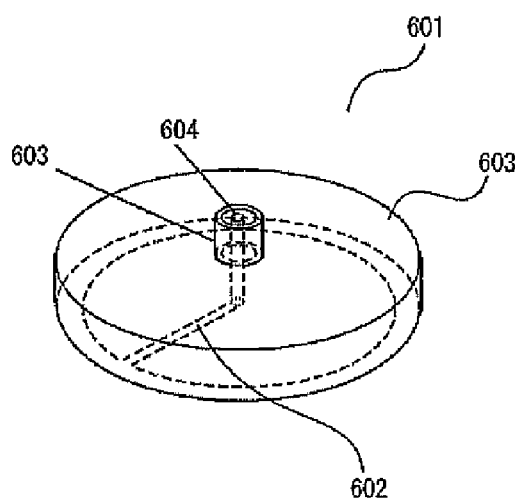
FIG. 14 is an explanatory diagram showing a schematic configuration of the circular interface device.

The interface devices of the other shapes are further proposed below. FIG. 13 and FIG. 14 are explanatory diagrams each showing a schematic configuration of the circular interface device. They are described below with reference to the diagram.

The upper row of the diagram is a bottom view of the interface device 601 and the middle row and the lower row shows the cross-sections. FIG. 14 is a perspective view of the interface device 601.

As shown in the diagram, the external conductor portion 603 of the circular interface device 601 is of a shape where a cylindrical side is attached to a disc, and a bordering is arranged on the reverse side of the disc. The internal conductor portion 602 is connected to the bordering.

In addition, the internal conductor portion 602 pass through the center of the circle and is connected to the path conductor portion 604 at a place equivalent to the center of the circle.

The path conductor portion 604 penetrates the aperture provided in the vicinity of the center of the external conductor 603.

Then, the region covered with the external conductor is filled with dielectric forming the insulator portion 605.

In this structure, a stable coupling of less position dependency is possible wherever in the mesh the interface device 601 is existent, because the interface device 601 is likely to be also coupled with a wave axisymmetric around the central axis of the interface device and can be coupled with both the $\phi_1$ mode and the axisymmetric mode (the mode in which electromagnetic wave radially travels at equal density of energy in all directions from the interface device 601).

In addition, in the technology, it may be configured such that the internal conductor portion 602 is cross-shape, the center of the cross-shape is connected to the path conductor 604, and the four ends of the cross-shape are connected to the external conductor portion 603.

FIG. 15 is an explanatory diagram showing the other technologies. They are described below with reference to the diagram.

In the example shown in the diagram, the internal conductor portion 602 and the path conductor portion 604 are integrated, one loop conductor is connected at the connection point 606 of the circular external conductor portion 603. A current path may be also secured by looping inside covered with the external conductor portion 603 functioning as a shield like this.

In addition to the aforementioned, a form wherein the internal conductor 602 is not connected to the external conductor portion 603 can be also considered. FIG. 16 is an explanatory diagram showing a relationship among the parameters and the conditions of the current and magnetic field in such a case. It is described with reference to the diagram below.

In the form that the internal conductor portion 602 is not directly connected to the external conductor portion 603, as shown in the upper row of the diagram, it is desirable that the length R of the internal conductor portion 602 is almost half of the wavelength λ. Impedance matching is performed by controlling the parameters among the width t of internal conductor portion 602, the distance w between the internal conductor portion 602 and the external conductor portion 603, the distance m between the contact point between the internal conductor portion 602 and the path conductor portion 604 and the end point of the internal conductor portion 602.

The three graphs in the lower row of the diagram show the current distribution, magnetic field distribution, and electric field distribution. The graphs of the diagram are further extended ones of FIG.

In the case of the example shown in the diagram, the length of the internal conductor portion 602 is set at half of the electromagnetic wavelength λ. As shown in the diagram, if the impedance Z viewed at the distance x towards the center of the interface device 601 from the right tip of the internal conductor portion 602, Z=∞ at x=0 because the circuit is open there, while Z=0 at x=λ/4.

Therefore, it is equivalent to a case where the internal conductor portion 602 and the external conductor portion 603 are short-circuited at a point of x=λ/4. Namely, it can be considered that a loop current path is formed by allowing the internal conductor portion 602 and the external conductor portion 603 to form a kind of capacitor at the wavelength λ.

Figure 17:
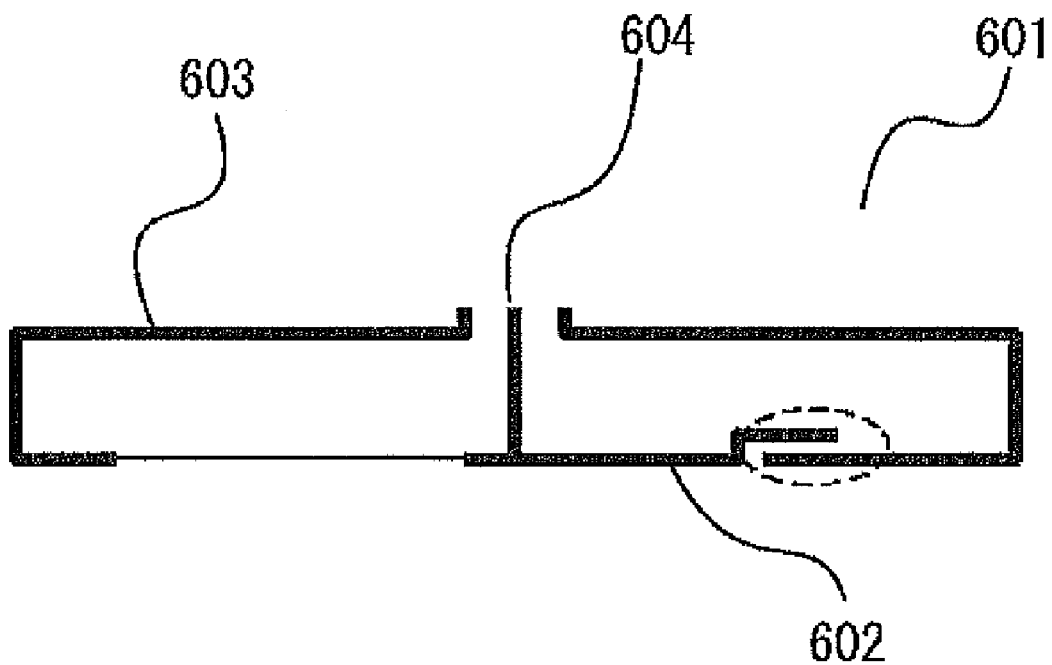
FIG. 17 is an explanatory diagram showing a method for performing impedance matching.

FIG. 17 is an explanatory diagram showing the other method for arranging the impedance matching. It is described with reference to the diagram.

As shown in the diagram, the internal conductor portion 602 is decoupled halfway, and is determined to be capacitively coupled.

Thus, dividing (cutting) the internal conductor portion 602 halfway brings about the same effect as attaching a capacitance (typically a capacitor) to the internal conductor portion 602 in series near the entrance of the interface device 601.

In these cases, although the current path is cut, the vicinity of the cut point results in functioning as a sort of capacitor, the experiment confirms that it is possible to have an excellent connection depending upon frequency bands to be used for communications. That is, even in such a case, it can be considered that a current loop is formed with respect to a non-direct current component.

In the case of the technology shown in FIG. 17, there is an advantage that impedance matching is easily realized by performing the decoupling even if an external shape of the interface device 601 is small.

In addition, in the case of the technologies shown in FIG. 16 and FIG. 17, the strength of radiation or reception of the electromagnetic wave is determined by the current flowing in the loop structure (including the cut) and the path length, and a relative positional relationship between the position of cutting and the signal carrying apparatus 101 does not directly determine the strength.

Thus, in the aforementioned technology, because the electromagnetic wave is two-dimensionally contained to perform communications, the energy required to transmit information to a certain distance is smaller than that of a so-called wireless communication.

In addition, it is also possible to supply an electric power because the region within which the energy is diffused is narrow.

Further, it is considered that a multipath problem can be solved and faster communication is possible as compared to the wireless communication.

Then, no electrical wiring is required, and signals can be received between the interface device 601 and the signal carrying apparatus 101.

(Experimental Results of the Basic Relevant Technology)

A dielectric of dielectric constant 10 is filled in the region covered with the external conduction portion 603 of the interface device 601, and it is determined that the frequency band is 2.4 GHz, R=10 mm, and w=1.6 mm. Although a device with the connection position m of the path conduction portion 604 shows excellent results even in the case of m=5 mm, the below-mentioned shows the experimental result in the case of m=0 mm. In addition, the mesh cycle d=15 mm.

Figure 18:
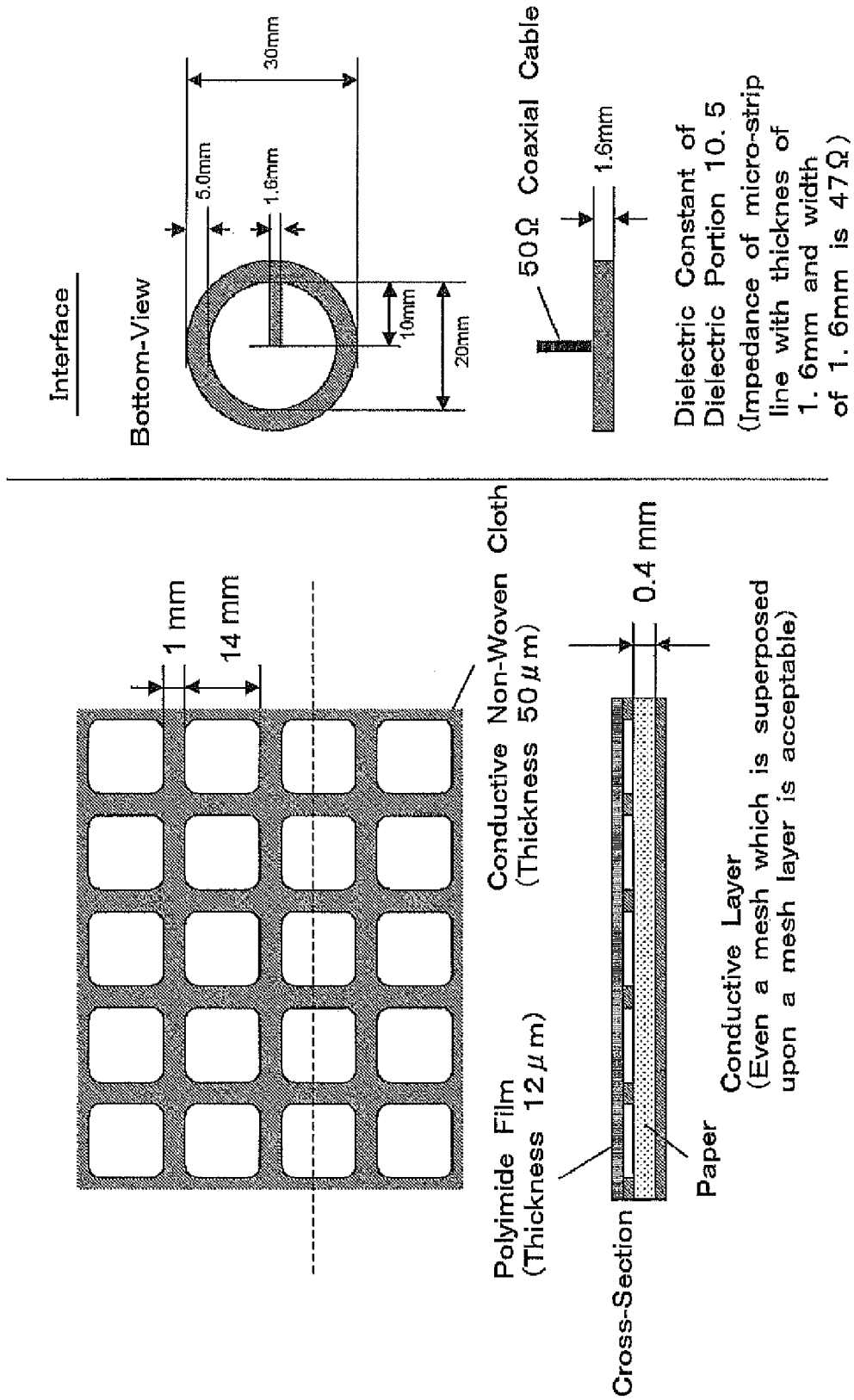
FIG. 18 is explanatory diagram showing experimental parameters of the signal carrying apparatus and the interface device.

FIG. 18 is an explanatory diagram showing the experimental parameters of the signal carrying apparatus 101 and the interface device 601.

Based on the data in the diagram, two interface devices 601 are disposed at the center-to-center distance 10 [cm], a 2.4 [GHz] signal of amplitude 1[V] is transmitted from one side to the other. The receiving voltage (S12) that is varied with the height (position in the z axial direction) of the reception-side interface device 601 is observed. In addition, a 50 [Ω] cable is connected to the interfaces on both sides to measure the receiving voltage (S12) with a network analyzer.

In addition, in the data in the diagram, "width 1 mm and aperture portion side 14 mm in the mesh" are described. These means the repeated unit of the mesh is 15 mm.

Figure 19:
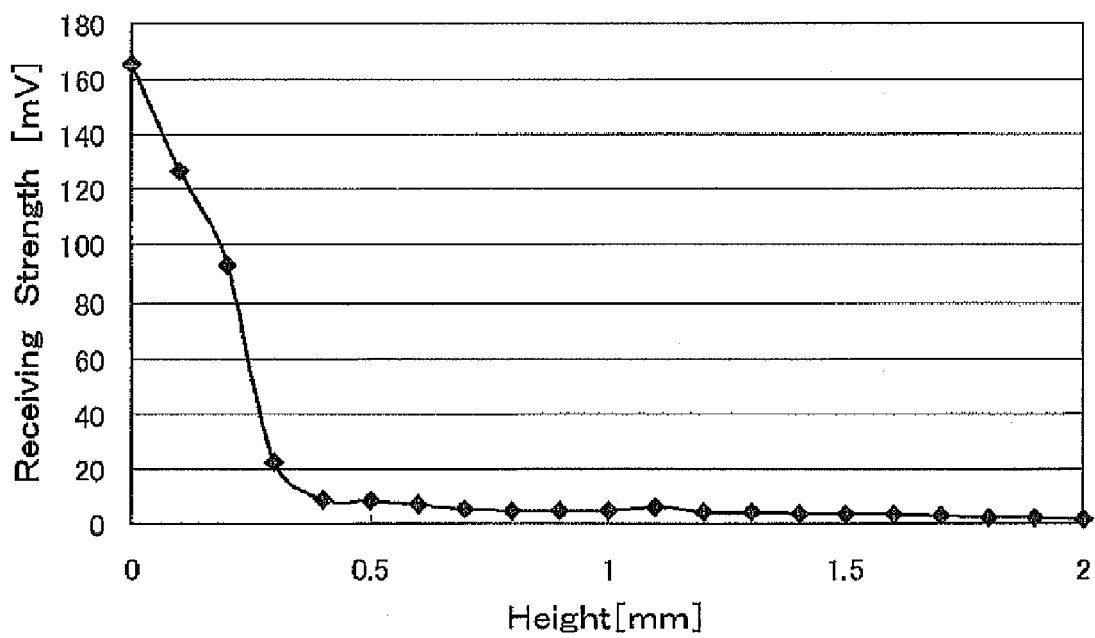
FIG. 19 is a graph showing receiving powers if the interface device is made to gradually be away from the signal carrying apparatus.

FIG. 19 is a graph showing the results. The receiving strength is immediately attenuated until it is being deviated by about 0.5 mm.

In the next experiment, the distance between the two interface devices 601 is determined to be 6 [cm], and the three ways of directions of the interface device 601 on the reception side to the meshes are considered. Receiving voltages S12 at the time when the signals of 1 V amplitude by each frequency in 1 GHz to 5 GHz are inputted are plotted in the graph. A 50Ω cable is each connected to the two interfaces to measure the receiving voltage (S12) with the network analyzer.

FIG. 20 is a graph showing the results. The left end and the right end in the lateral axis of the graph correspond to 1 GHz and 5 GHz, respectively. As shown in the diagram, signals are observed in broad bands, and the availability is confirmed. In addition, the individual impedances are shown in the lowest row of the diagram. It is understood that the impedance in 2.4 GHz band varies with the orientation of installation, because coupling between the interface device 601 and the signal carrying apparatus 101 is strong.

Figure 21:
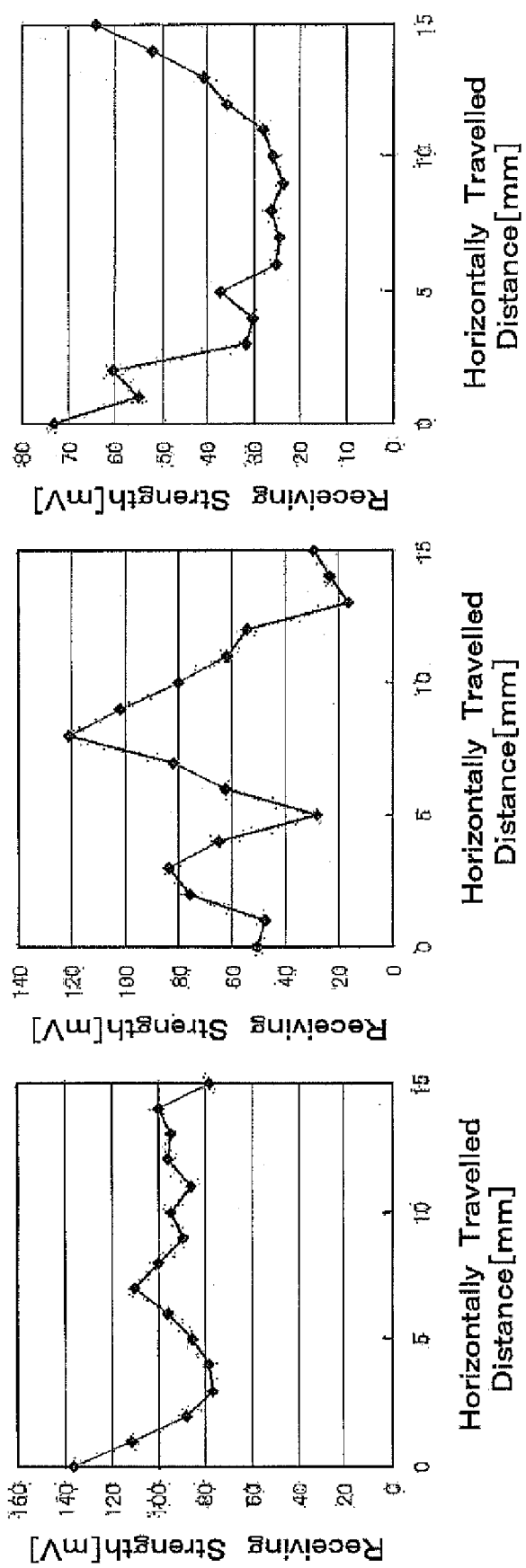
FIG. 21 is a graph showing a receiving power of the other interface device if the position of one interface device out of the two interfaces is moved.

FIG. 21 is a graph in the case where the position of one interface device 601 is moved in the aforementioned case. As shown in the diagrams, a sufficient strength-signal is observed at any positions.

The variously modified examples of the aforementioned technology are described below.

FIG. 22 is an explanatory diagram showing cross-sections of the other technologies of the interface device. They are described with reference to the diagram below.

The interface device 601 described in the lower row of the diagram is a form equivalent to what is a combination of the communication device and the loop antenna 202 including the communication circuit 201 described in FIG. 2 are covered with the external conductor portion 603. It can be considered that the released side of the loop antenna 202 corresponds to the internal conductor portion 602, and the external conductor portion 603 side of the loop antenna 202 is equivalent to the path conductor portion 604.

The interface device 601 described in the middle row of the diagram adopts the communication device including the communication circuit 201 in place of the path conductor portion 604, and the external conductor portion 603 and the internal conductor portion 602 are direct-coupled with the communication device including the communication circuit 201.

The interface device 601 described in the upper row of the diagram is the form in which a point that the internal conductor portion 602 and the external conductor portion 603 are connected is in the vicinity of the aperture, and is similar to the technology shown in FIG. 15.

the interface device 601 of the present invention achieves dense coupling of the electromagnetic field by allowing the internal conductor portion 602 to constitute a part of the loop and allowing the loop to be vertical to the surface of the signal carrying apparatus 101 when the interface device 601 contacts the signal carrying apparatus 101. In this case, the external conductor portion 603 covering these portions is prepared to prevent the leak of the electromagnetic field.

FIG. 23 is a cross-section showing a relationship between the interface device and a signal carrying apparatus of the other aspects which is connectable thereto. It is described with reference to the diagram.

The interface device 601 described in the upper row of the diagram is disposed in the vicinity of an aperture of the conductive plate 901 having the aperture out of the two oppositely disposed conductive plates (It may be sheet-like conductors. Hereinafter is the same). As in the aforementioned technology, because the electromagnetic wave is contained between the two conductive plates, signal carrying is possible and simultaneously, the interface device 601 performs communications through the electromagnetic field that leaks from the aperture.

The interface device 601 described in the lower row of the diagram is also the same as in the aforementioned. However, in the technology, the lower conductive plate 901 and the upper conductor 901 of narrower width than the former are disposed, any of the two conductor plates is extended in the direction perpendicular to the diagram, and they are of a strip shape as a whole. Then, the electromagnetic wave is contained in the region between the two conductive plates 901. However, because the widths are different, as shown in the diagram, the electromagnetic field leaks at a place where the lower conductive plate 901 is exposed. Then, the interface device 601 performs the communications using this.

Figure 24:
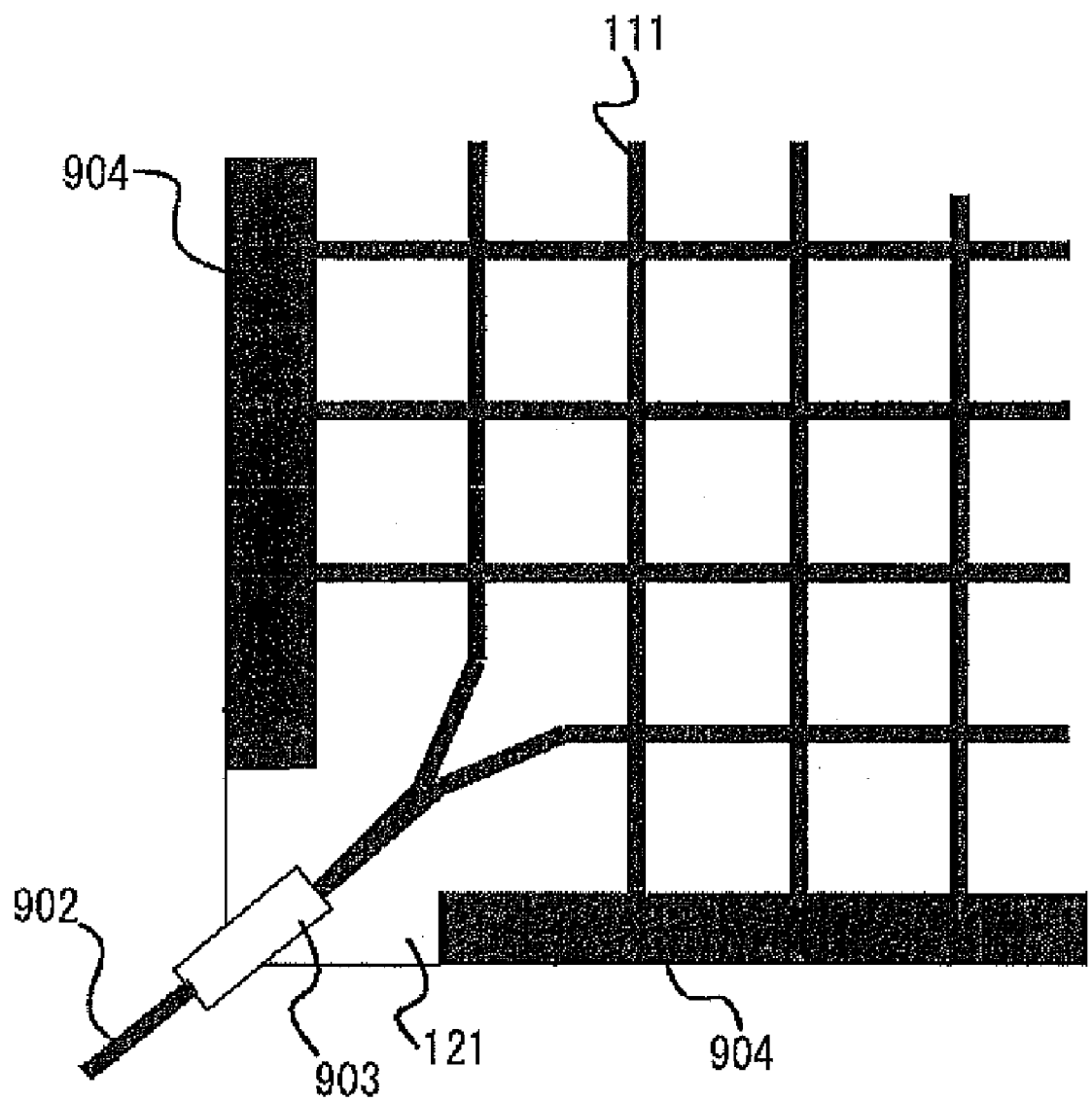
FIG. 24 is an explanatory diagram of a wired connection onto the signal carrying apparatus.

FIG. 24 is an explanatory diagram in case a wired connection performed onto the signal carrying apparatus in. It is described with reference to the diagram below.

As shown in the diagram of the meshed first conductor portion 111 of the signal carrying apparatus 101, the width of the wire pattern just before the junction portion 903 connected to the core of the coaxial cable 902 is adjusted so as to match the impedance. In addition, the external conductor of the coaxial cable 902 is connected to the second conductor portion 121.

In addition, in the example shown in the diagram, the striped conductor portion 904 is disposed in the edge of the first conductor portion 111, the electromagnetic wave absorber such as a collective resistor is disposed between the striped conductor portion 904 and the second conductor portion 121 to prevent the leak of the electromagnetic wave.

Figure 25:
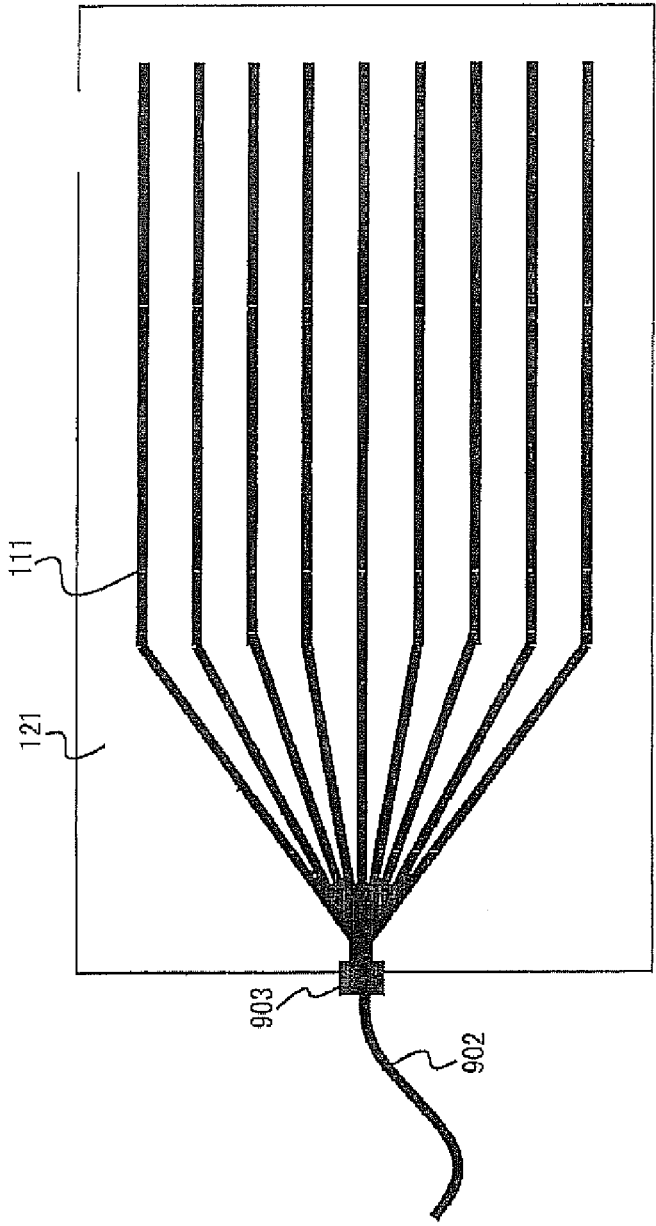
FIG. 25 is an explanatory diagram showing a basic relevant technology where the first conductor portion is of a striped shape in the signal carrying apparatus in place of a meshed one.

FIG. 25 is explanatory diagram showing the embodiment where the first conductor portion of the signal carrying apparatus is of stripe shape in place of mesh.

As shown in the diagram, the first conductor portion 111 of the signal carrying apparatus 101 is disposed in front of the second conductor portion 121 in the diagram, and the first conductor portion 111 is of stripe shape in place of the mesh where the stripes are converged at the root. If the interval of stripes is d, the similar leak region as in the aforementioned technology can be formed where the height of leak of the electromagnetic wave is about d.

EMBODIMENT OF THE PRESENT INVENTION

The communication system of the present invention is described based on the aforementioned basic relevant technology. In addition, it is possible to suitably select and apply the factors of the aforementioned basic relevant technology even in the embodiment of the present invention described below.

In the aforementioned basic relevant technology, the electrode size of the interface device is mainly assumed to be comparable with or smaller than the repeated unit of the of the first conductor portion 111 of the signal carrying apparatus 101. In the present invention, it is determined that requirements different from this are imposed the electrode of the interface and the first conductor portion 111 of the signal carrying apparatus 101.

In the present invention, the following items are considered as the first conductor portion 111 of the signal carrying apparatus 101:

(a) A meshed conductor that is similar to the aforementioned basic relevant technology.

(b) A conductor which is not flattened by corrugating a sheet of conductor sheet or providing irregularities for it. An aperture is not required, unlike the meshed conductor.

(c) A conductor which is cloth-like (felt-like) and is made by entangling conductive fibers. It can be regarded as finely meshed conductor. However, in contrast with "mesh" it is of a structure where the meshes are three-dimensionally entangled.

(d) A sheet-like material where fine conductive particles are dispersed and distributed in dielectric. The fact that it functions as "a conductive material" depending upon communication frequency bands even if the fine conductive particles are spaced out, is as described above.

(e) A dielectric of extremely high dielectric constant (permittivity).

Any of the aforementioned (a) to (c) is such that the spatial distribution of a conductor is ununiform in the expansion direction of the electrodes of the interface device in the region of the first conductor portion 111 where the electrodes of the interface device are opposed with some spacing.

In addition, the dielectric filled in the interval region 131 and the first conductor portion 111 can be also integrally configured. In this case, for making the aforementioned (d) and (e), the conductor may be unevenly distributed on the surface of the dielectric, and "the surface" in this case may be also extremely thin.

If the interface device is considered such that the size of the electrode is comparable with or smaller than the repeated unit of the meshes as mainly described in the aforementioned technology, the region of the first conductor portion 111 facing the electrodes (this has an area equal to that of the electrodes) is narrow. Therefore, it can be considered that the spatial distribution in the conductor is microscopically even in the narrow region, which is the difference in the assumed uniformity from that of the present invention.

In an evenly planar conductor, a current path is straight. However, if the unevenness (ununiformity) of the distribution in the conductor as above is existent, the current path can not be linear (straight). That is, it is assumed that the current path in the first conductor portion 111 is not linear in the present invention.

It is also assumed that each of quantity corresponding to "the repeated unit length of the meshes" (a corrugation cycle or mean distance between fibers/fine particles and the like) is sufficiently smaller than the wavelength of the frequency band in the carried signals.

In addition, it is derived that if a both-sided communication is enabled, the second conductor portion may be of the same shape as above.

Figure 26:
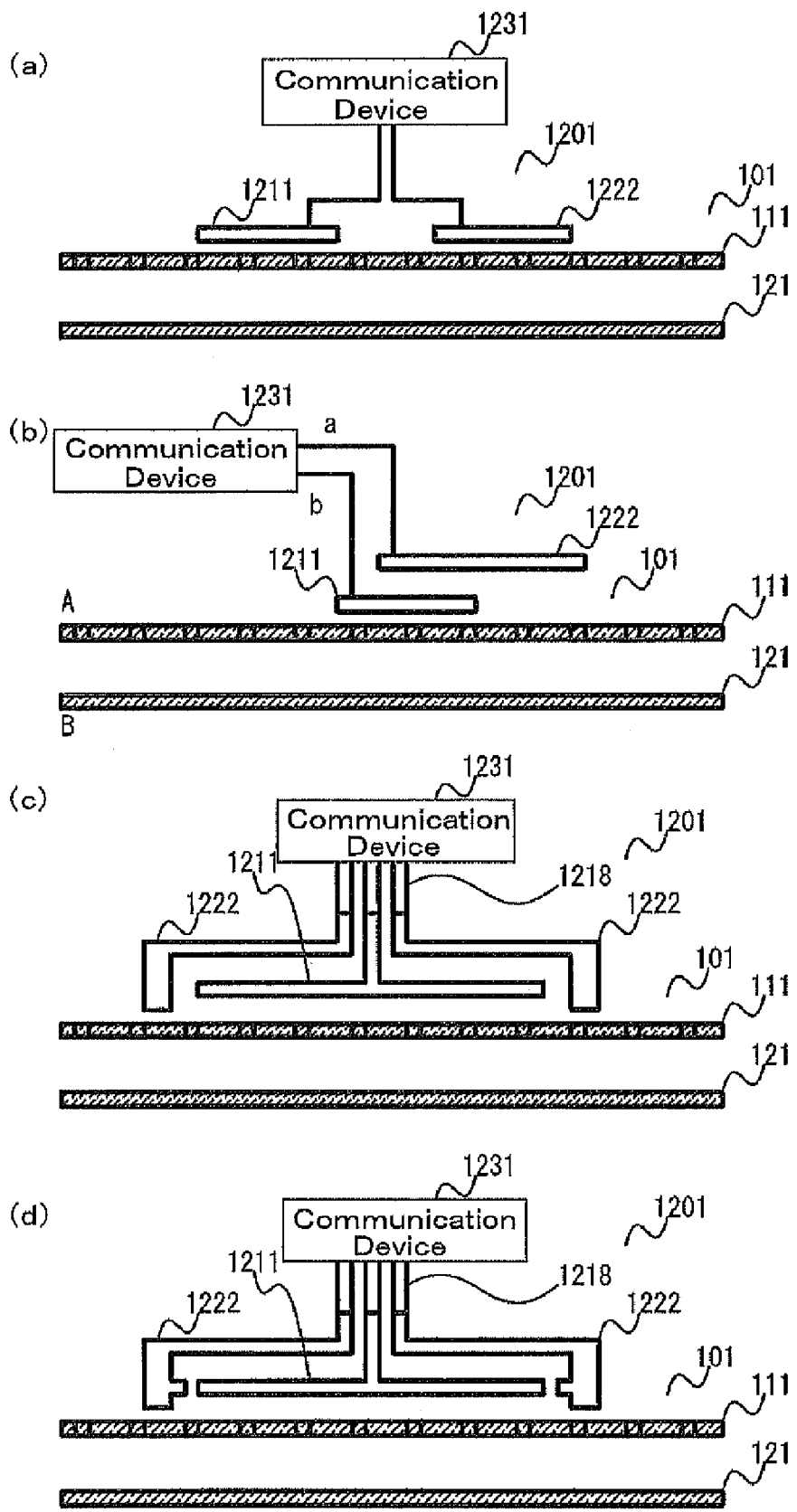
FIG. 26 is an explanatory diagram showing a cross-section of the embodiments of the communication system including the interface device and the signal carrying apparatus.

FIG. 26 is an explanatory diagram showing the shapes of the cross-sections of the embodiment of the communication system including the interface device and the signal carrying apparatus having the meshed first conductor portion. It is described with reference to this diagram.

As shown in this diagram, the interface device 1201 has the first electrode 1211 and the second electrode 1222, which are each disposed at "the different positions" in the leak region 141 of the signal carrying apparatus 101.

The diagram (a) shows the conditions where the first electrode 1211 and the second electrode 1222 are disposed at almost the equal distances from the first conductor portion 111 of the signal carrying apparatus 101 and in parallel with the sheet expansion direction of the signal carrying apparatus 101.

In the diagram (b), the distance between the first electrode 1211 and the first conductor portion 111 is different from that between the second electrode 1222 and the first conductor portion 111. In addition, in the diagram (b), it is determined that the size of the first electrode 1211 is different from that of the second electrode 1222. However, they may be the same.

In the diagram (c), the first electrode 1211 has a disc-like shape, and the second electrode 1222 has a cylindrical shape with a lid covering the former. They are the cross-sections thereof. The electrodes 1211, 1222 each have an axisymmetric shape though the shapes, positions, and distances thereof are different from each other, and are connected to the communication device 1231 through the coaxial cable 1218.

The diagram (d) shows that the shape is such that an edge that is extended to the disc of the first electrode 1211 is further provided on the lid-cylindrical shape side of the second electrode 1222 shown in the diagram (c).

It is typical that the radius of the cylinder of the second electrode 1222 in the diagram (c) and (d) is almost $0.38\lambda$ where the electromagnetic wavelength (a dielectric may be filled or the air is acceptable) between the second electrode 1222 and the first electrode 1211 is assumed as $\lambda$. However, the size may be suitably changed. In addition, it is desirable that the distance between the first electrode 1211 and the second electrode 1222 and the width of the edge extended from the second electrode 1222 are set so as to perform impedance matching viewed from the junction portion with the cable.

If the first electrode 1211 and the second electrode 1222 are disposed in the leak region of the first conductor portion 111, they are proximity-coupled therewith. Therefore, (a non-direct) current circuit is formed by the communication device 1231, the first electrode 1211, the second electrode 1222, and the first conductor portion 111.

For example, it is considered that if the size of the first electrode 1211 or the second electrode 1222 is smaller than the electromagnetic wavelength and is of a simple shape that has neither an extreme constriction nor a swirl shape, a kind of capacitor is formed to perform capacitive coupling if the first electrode 1211 and the second electrode 1222 are put closer to the first conductor portion 111 up to a distance sufficiently smaller than the electromagnetic wavelength. This is an example of the simplest proximity coupling.

On the other hand, if the width or the length of the first electrode 1211 or the second electrode 1222 is almost the same as the electromagnetic wavelength, for example, in the case where the electrode 1211 or the second electrode 1222 is long in one direction or has a two-dimensional expansion to some extent, current distribution and charge distribution occur on the surface thereof. In this case, if the first electrode 1211 and the second electrode 1222 are put closer to the first conductor portion 111 to the electromagnetic wavelength until the distance is quite small thereto, the current distribution and charge distribution almost reversed to the facing surfaces of the first electrode 1211 and the second electrode 1222 are induced on the facing surface of the conductor portion 111.

The former is a typical one in the case where a lower frequency (the low frequency where the electromagnetic wavelength is longer than the electrode) is adopted for an electromagnetic field. In that case, a combination of the signal carrying apparatus 101, the interface device 1201, and the communication device 1231 can be regarded as a quasisteady electrical circuit/electronic circuit.

The latter is a typical one in the case where high frequency waves such as microwaves are adopted as electromagnetic waves. In that case, a combination of the signal carrying apparatus 101, the interface device 1201, and the communication device 1231 is considered as a high frequency circuit, particularly including transmission by electromagnetic wave.

Generally, an embodiment wherein the distance between the first electrode 1211 and the first conductor portion 111 and distance between the second electrode 1222 and the first conductor portion 111 as shown in the diagram (b) are determined to be different from each other is suitable for communications in low frequencies.

On the other hand, an implementation wherein that the distance between the first electrode 1211 and the first conductor portion 111 and the distance between the second electrode 1222 and the first conductor portion 111 as shown in the diagram (b) are determined to be almost equal to each other is suitable for communications in high frequencies such as micro waves. In this case, the overall length of distance between the first electrode 1211 and the second electrode 1222 needs to be not extremely smaller than the electromagnetic wavelength. For example, it is enough if the distance is lager than $1/10$ to $1/100$ of the electromagnetic wavelength. In addition, because the optimal condition depends upon the drive circuit or receiving circuit of the communication device 1231, an actual dimension may be determined by an actual device or an experiment.

Shapes such that the shapes, positions, and distances of the first electrode 1211 and the second electrode 1222 as shown in the diagram (c) are determined to be all different may be utilized in various electromagnetic wavelengths. It is described in detail below.

In addition, because the sizes of the first electrode 1211 and the second electrode 1222 are larger than the repeated unit length of the meshes in the present invention, the position dependency of the interface device 1201 upon the signal carrying apparatus 101 is low and positioning in performing communications is facilitated.

If the meshed first conductor portion 111 as aforementioned is adopted, "the repeated unit length" as in the basic related technology can be considered. However, because such a mesh-like repetition is not inevitably a requirement in the present invention, other conditions should be assumed. The inventors have thoroughly proceeded with the study and could conceive the fixation of the conditions by "normalized sheet reactance". It is described below.

Figure 27:
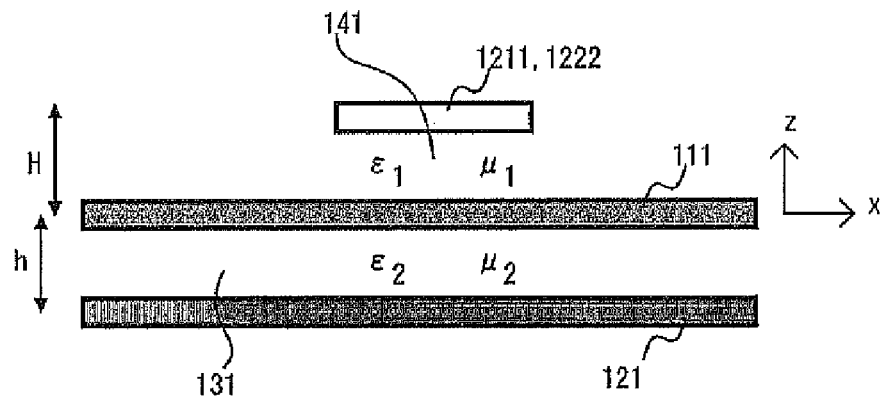
FIG. 27 is an explanatory diagram explaining various conditions in the signal carrying apparatus and the interface device of the embodiment according to the present invention.

FIG. 27 is an explanatory diagram for explaining the conditions in the signal carrying apparatus and the interface device of the embodiment according the present invention. Below, it is described with reference to the diagram.

Here, in the present invention, one or both of the first electrode 1211 and the second electrode 1222 may meet the conditions as mentioned below. Therefore, in the diagram, one electrode representing the first electrode 1211 and the second electrode 1222 is illustrated.

If the voltage between the first conductor portion 111 and the second conductor portion 121 in the signal carrying apparatus 101 is varied in the frequency band $\omega/(2\pi)$, electric field is generated in the vicinity of the surface of the first conductor portion 111 to allow current to flow in the vicinity of the surface of the first conductor portion 111.

Here, when the component in the surface direction of the first conductor portion 111 (horizontal direction in the diagram) of the electric field is expressed as $E_x \exp(j\omega t + \alpha)$(unit:[V/m])

and the component in the surface direction of the first conductor portion 111 (horizontal direction in the diagram) of the current density is expressed as $I_x \exp(j\omega t + \beta)$ (unit: [A/m]), sheet impedance $\sigma$ as in sheet resistance can be defined as $\sigma = E_x/I_x = r + jX$ considering the phase information $\alpha$ and $\beta$ are included in complex numbers $E_x$ and $I_x$. In addition, a contribution caused by charge oscillating in the dielectric is determined to be included in $I_x$. In addition, if the sheet has a meshed structure, $E_x$ and $I_x$ are each determined to be the mean value over the cycle of the structure.

If the first conductor portion 111 is a homogeneously excellent conductor, $\sigma \approx 0$. However, in the present invention, the conductor distribution in the first conductor portion 111 is not even. Therefore, $\sigma \neq 0$.

Here, the real component r and the imaginary component X are existent in $\sigma$. The imaginary component X is referred to as a sheet reactance.

In the present invention, because the current is allowed to forcibly flow in a bent path along a uneven conductor distribution or to flow in conductors mutually spaced out, an inductance component or a capacitance component is generated to result in $X \neq 0$ because the similar effect as a micro-coils or capacitors are disposed are obtained. For example, X>0 in the case of the meshes, and X<0 in the case where fine particle conductors are spaced out, dispersed and distributed.

To facilitate understanding, it is described below assuming a typical condition that X is a proper/small value. Although the leak of the electromagnetic field is large if the absolute value of X is extremely large, it is still possible to realize a communication system.

A certain level of the electromagnetic field leaks on the surface of the first conductor portion 111 as in the aforementioned basic relevant technology. However, because the intensity of an electric field that leaks is proportional to sheet impedance $\sigma$, the electromagnetic energy that leaks is small if $\sigma$ is small unless the electrodes 1211, 1222 approach the first conductor portion 111.

According to the analysis of the inventors, if the parameters, voltage V between the first conductor portion 111 and the second conductor portion 121, dielectric constant $\in_1$, magnetic permeability $\mu_1$ outside the signal carrying apparatus 101, dielectric constant $\in_2$, magnetic permeability $\mu_2$ between the first conductor portion 111 and the second conductor portion 121, and distance h between the first conductor portion 111 and the second conductor portion 121, are assumed, the component $E_z$ in the direction (the vertical direction in the diagram) vertical to the surface of the first conductor portion 111 in the leak electric field can be approximately expressed as follows to the position x along the surface of the first conductor portion 111 and the distance z from the surface of the first conductor portion 111:

$E_z = (k_2^2/k_1)V \exp(-k_1 z)\exp(-jkx)\exp(j\omega t);$ $k_2^2 = j\sigma \in_2 \omega/h;$ $k_1^2 = (\mu_2 \in_2 - \mu_1 \in_1)\omega^2 - k_2^2;$ and $k_2^2 = \mu_2 \in_2 \omega^2 - k_2^2.$ In addition, for approximation, the following are supposed:

$k_2 h \ll 1$; and $\in_1 k_2 \sin(k_2 h)/(\in_2 k_1) \ll 1.$

Here, the condition is equivalent to the state that the thickness h of the interval region 131 is determined to be almost equal to that in the electromagnetic wavelength or less.

Thus, the leak electric field is small unless the electrodes 1211, 1222 are put close to the first conductor portion 111. However, if the electrodes 1211, 1222 are put close, the electromagnetic energy is likely to be absorbed into the space between the first conductor portion 111 and electrodes 1211, 1222. Describing this in connection with the aforementioned basic relevant technology, it is that "the leak region 141 is absorbed between both, that is, between the electrodes 1211, 1222 and the first conductor portion 111 to increase the height thereof". In this case, dielectric constant $\in_1$ and magnetic permeability $\mu_1$ are the dielectric constant and magnetic permeability between the first conductor portion 111 and the electrodes 1211, 1222.

Under the circumstances, the surface directional component $E_x^u$ and the surface vertical component $E_z^u$ of the electrical field absorbed into the space between the first conductor portion 111 and the electrodes 1211, 1222, and the directional component $E_z$ (vertical direction in the diagram) vertical to the surface of the first conductor portion 111 of the leak electric field can be approximately expressed as functions of position x along the surface of the first conductor portion 111 and distance z from the surface of the first conductor portion 111, as below-mentioned;

$$E_x^u = Cj/(k \sin h(k_1 H)) \sin h[-k_1(z-H)] \exp(-jkx)\exp(j\omega t); \text{ and}$$

$$E_z^u = C/(k_1 \sin h(k_1 H)) \cos h[k_1(z-H)] \exp(-jkx)\exp(j\omega t)$$

using the solutions of k, $k_1$, $k_2$ of $$k_2^2 - k_1^2 = \mu_1 \in_1 \omega^2;$$

$$k_2^2 + k^2 = \mu_2 \in_2 \omega^2; \text{ and}$$

$$\in_2/[k_2 \tan(k_2 h)] - \in_1/[k_1 \tan(k_1 H)] = 1/(j\omega\sigma)$$

where H denotes the distance between the first conductor portion 111 and the electrodes 1211, 1222.

Because substantially 2 sets of the solutions of k, $k_1$, $k_2$ exist if the wave direction is limited to the positive x direction, the electromagnetic field propagates in the two modes. In addition, since these modes have different spatial wave lengths, it is in principle possible to individually separate and detect them. These two modes are referred to as mode 1 (or J1) and mode 2 (J2), respectively.

In this analysis, it is assumed that the first conductor portion 111 and the second conductor portion 121, the electrodes 1211, 1222, and the second conductor portion 121 continue infinitely in the horizontal direction, the electrodes 1211, 1222 and the second conductor portion 121 are good conductors with resistivity of zero, and the sheet impedance of the first conductor portion 111 is σ. In addition, the thicknesses of these are assumed to be adequately thin. In [numerical formula 1] and [numerical formula 2] below, z is defined to denote the distance in the vertical direction from the second conductor portion 121, is determined to be z different from the aforementioned.

A wave field that is even in the y direction traveling in the x direction out of possible waves propagating in the planar expansion direction (x-y plane) of these conductors is expressed by a linear combination of the two modes by following the Maxwell equations.

The approximations of the wave $\Phi_{1+}^{H,h}$ of J1 and the wave $\Phi_{2+}^{H,h}$ of J2 in the two modes when $\in_1 = \in_2 = \in$ and $\mu_1 = \mu_2 = \mu$ are assumed are shown below.

$$\Phi_{1+}^{H,h} = \phi_{1+}^{H,h} \exp(-jk_S x)\exp(j\omega t) \quad \text{[Formula 1]}$$

$$\phi_{1+}(x) = \begin{pmatrix} E_z^U \\ B_y^U \\ E_z^L \\ B_y^L \end{pmatrix} = C \begin{pmatrix} 1 \\ -\sqrt{\varepsilon\mu} \\ 1 \\ -\sqrt{\varepsilon\mu} \end{pmatrix}$$

wherein $$k_S = \sqrt{\varepsilon\mu}\,\omega$$

-continued $$\Phi_{2+}^{H,h} = \phi_{2+}^{H,h} \exp(-jk_A x)\exp(j\omega t) \quad \text{[Formula 2]}$$

$$\phi_{2+}^{H,h} = \begin{pmatrix} E_z^U \\ B_y^U \\ E_z^L \\ B_y^L \end{pmatrix} = C \begin{pmatrix} -\dfrac{1}{H} \\ \dfrac{\varepsilon\mu\omega}{k_2}\dfrac{1}{H} \\ \dfrac{1}{h} \\ -\dfrac{\varepsilon\mu\omega}{k_2}\dfrac{1}{h} \end{pmatrix}$$

wherein $$k_A = \sqrt{-j\omega\varepsilon\sigma\left(\frac{1}{H}+\frac{1}{h}\right)+\varepsilon\mu\omega^2}$$

The condition for establishing the approximation is as follows:

$$|j\omega\sigma(\in_1/H+\in_2/h)|H^2 \ll 1, |j\omega\sigma(\in_1/H+\in_2/h)|h^2 \ll 1 \quad \text{[Formula 3]}$$

Here, C is a constant, $E_z^U$ is the vertical electrical field outside the signal carrying apparatus 101, $B_y^U$ is the magnetic field in the y direction outside the signal carrying apparatus 101, $E_z^L$ is the vertical electrical field inside the signal carrying apparatus 101, and $B_y^L$ is the magnetic field in the y direction inside the signal carrying apparatus 101.

The wave $\Phi_{1+}^{H,h}$ in mode 1 is a mode where an even electromagnetic field is generated in the leak region 141 and the interval region 131 and current is not allowed to flow in the first conductor portion 111.

Considering the wave $\Phi_{2+}^{H,h}$ in mode 2, when σ=jX (X>0), $k_A$ and $k_S$ are real numbers and $k_A > k_S$ is satisfied. Further, when X is inductive and is proportional to ω, $k_A$ is proportional to ω, the propagating velocity of the mode 2 is constant not depending upon a frequency, and its group velocity and phase velocity are also coincided with each other.

Supposing that H>>h, and the interface device is determined to be remote from the signal carrying apparatus 101, most energy is likely to remain inside the signal carrying apparatus 101.

Here, normalized sheet reactance γ where sheet reactance X is normalized and normalized distance η where the distance H between the first conductor portion 111 and the electrodes 1211, 1222 is normalized, in the case where the signal carrying apparatus 111 and the electrodes 1211, 1222 are put close, are considered as $$\gamma = X\in_2/[h\omega(\in_2\mu_2 - \in_1\mu_1)]; \text{ and}$$

$$\eta = H\in_2/(h\in_1).$$

The inventors have performed various numerical simulations on them and studied what kinds of conditions should be established to cause adequate aspiration of the electrical field. The numerical simulations are described below.

Figure 28:
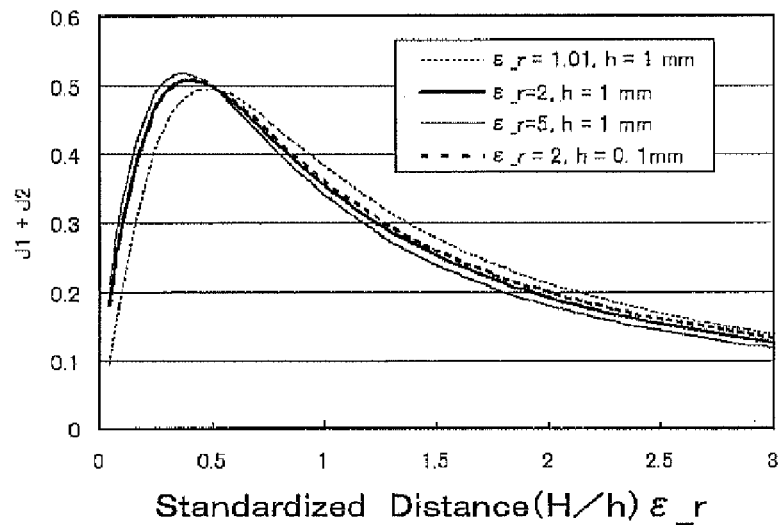
FIG. 28 a graph showing a relationship between normalized distance η and electromagnetic energy that is absorbed if normalized sheet reactance is assumed as γ=1.

FIG. 28 is a graph showing a relationship between the normalized distance η and the electromagnetic energy that is aspired where the normalized reactance γ=1. Below, it is described with reference to the diagram.

In the graph, the intensity of the electromagnetic power flowing in the x direction between the electrodes 1211, 1222 and the first conductor portion 101 when the incident electromagnetic wave comes from the left hand to the right hand to reach the electrodes 1211, 1222 having half-infinite length is shown, assuming that the intensity of the incident electromagnetic power is 1.

In the graph, $\mu_1=\mu_2$ is assumed, and the results under 4 ways of the conditions are shown with regard to combinations of ratio of dielectric constant $\in_r=\in_2/\in_1$ and the distance h between the first conductor portion 111 and the second conductor portion 121. The horizontal axis (normalized distance $(H/h)\in_r$) indicates normalized distance η, and the vertical axis indicates the ratio of the absorbed power into the space between the first conductor portion 111 and the electrodes 1211, 1222 to the incident power into the space between the first conductor portion 111 and the second conductor portion 121.

Here, the vertical axis (J1+J2) shows the sum of the powers of the modes that are evaluated at the time at which it is assumed that two modes are each solely although the two modes are actually interfered with each.

As shown in the graph, the ratio of aspiration in the case where the normalized distance η is about 0.5 is the maximum that is about 50%. In addition, it is understood that at least about 40% thereof can be aspired when the normalized distance η is 0.2 to 0.8 and at least about 30% can be aspired when the normalized distance η is 0.1 to 0.3. In addition, this tendency remains almost unchanged even if the value of h or of $\in_r$ is varied.

Figure 29:
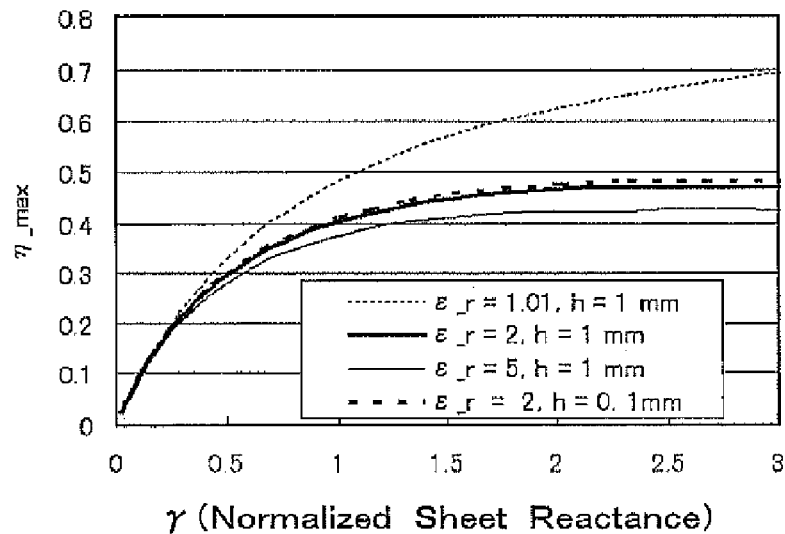
FIG. 29 is a graph showing a value ($\eta_{max}$) of normalized distance η that maximize the percentage of absorbable energy for a normalized sheet reactance γ.
Figure 30:
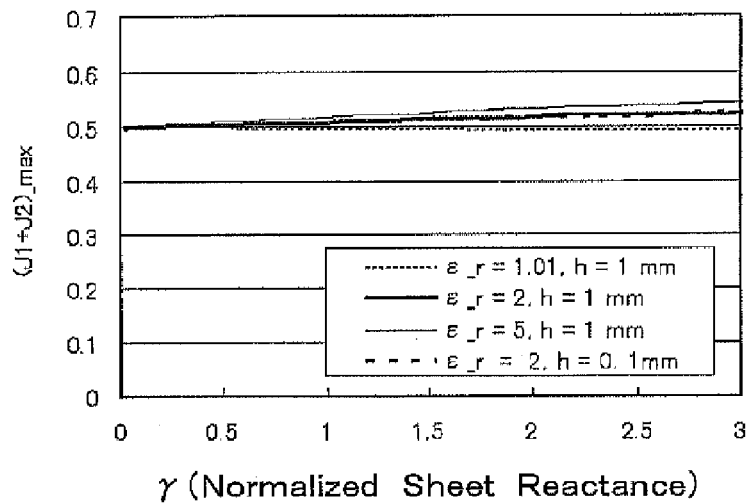
FIG. 30 is a graph showing the maximum value $((J1+J2)_{max})$ of the percentage of the absorbable energy in the case where normalized distance η varies for a normalized sheet reactance γ.

FIG. 29 is a graph showing the value $(\eta_{max})$ of the normalized distance η that maximizes the absorbable energy for normalized sheet reactance γ. FIG. 30 is a graph showing the maximum value $((J1+J2)_{max})$ of the absorbable energy ratio when a normalized sheet reactance. Below, it is described with reference to the diagram.

Referring to FIG. 30, it is understood that about 50% can be aspired at the maximum irrespective of the value of the normalized sheet reactance γ. As shown in FIG. 29, the maximizing value $\eta_{max}$ of the normalized distance is about 0.3 when γ is 0.5 and $\eta_{max}$ is about 0.4 when γ is 1. This tendency remains almost unchanged even if the value of h or of $\in_r$ is varied. As shown in the figures, the smaller γ is, the lower the efficiency of the signal carrying, but it is still possible to carry the signal in the case even where the normalized sheet reactance γ is 0.1 or less.

Figure 31:
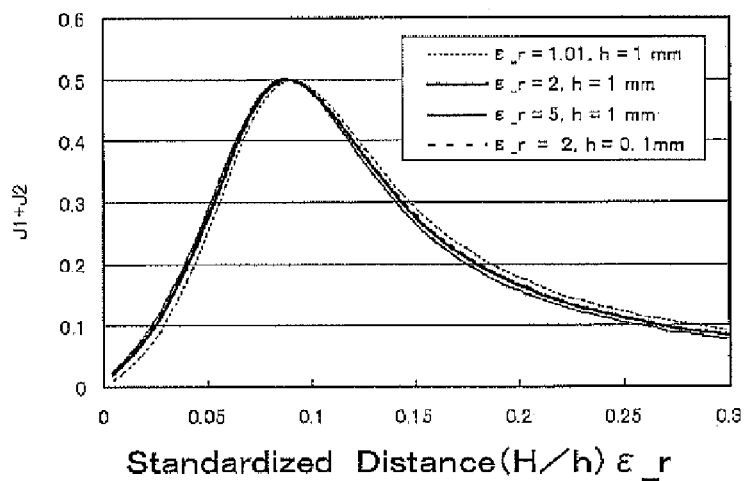
FIG. 31 is a graph showing a relationship in percentage between normalized distance η and the absorbable energy in the case where γ=0.1 is assumed.

FIG. 31 is a graph showing a relationship between the normalized distance η and the absorbable energy percentage when γ=0.1 is assumed. It is described with reference to the diagram.

As shown in the diagram, the normalized distance η needs to be made close to about 0.1 to aspire an adequate electromagnetic energy when γ=0.1.

Here, it is considered that a case that X>0 in the aforementioned simulations. However, the same conclusion as in the aforementioned analysis is obtained by the absolute value of γ in the case of X<0.

The following facts are found from these analysis:

The lower limit of the absolute value of a practical γ that enables the system to perform communications (without extremely putting close of the interface device 1201) even if small gaps are present between the first conductor portion 111 of the signal carrying apparatus 101 and the first electrode 1211, and the second electrode 1222 of the interface device 1201 is about 0.1 to 0.2. However, it is desirable that the lower limit of the absolute value is about 0.3 to 0.4 or that or more to exhibit a high performance to some extent. In other words, the absolute value of γ needs to be "not extremely smaller than 1".

In addition, electromagnetic energy sufficient for communications can be aspired if the normalized distance η is set at about 1 or less, when the absolute value of γ is substantially the same as 1 (the lower limit is about 0.1 to 0.4) or larger.

In addition, the dielectric constant $\in_2$ of the interval region 131 needs to be suppressed to an appropriate upper limit value, because an actual distance H and dielectric constant $\in_2$ are inversely proportional to each other when the normalized distance η is constant.

Further, it is desirable that the thickness h of the interval region 131 between the first conductor portion 111 and the second conductor portion 121 is almost the same as in the wavelength or the wavelength or less. Communications are possible even if the thickness h is equal to the wavelength or greater.

These conditions all show the ranges of various parameters for practical operations of the present invention.

In addition, if layers or films of dielectric are present on the surface of the electrodes 1211, 1222 or the surface of the first conductor portion 111, the normalized distance is given by the sum of the normalized distance of the space (gap) calculated based on the aforementioned calculation and the normalized distances of the individual dielectric layers or films. If a dielectric of dielectric constant $\in$ and thickness t is present on the surfaces of the electrodes 1211, 1222, a contribution portion to the normalized distance of the dielectric is $t\in_2/(h\in)$. This means that, in the case where the interval region 131 or the leak region 141 is uneven, the mean values of the permittivities in these regions are considered as permittivities $\in_1$ or $\in_2$ of the regions.

In addition, it is typical that the electrodes 1211, 1222 of the interface device 1201 include a good conductor. However, even if they include a material with the sheet impedance almost the same as that of the first conductor portion 111 or less, the same effect as in the aforementioned can be obtained.

Figure 32:
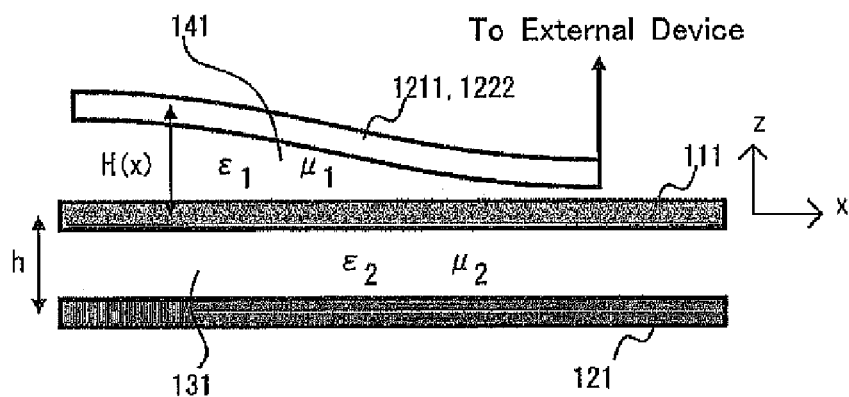
FIG. 32 is an explanatory diagram explaining an electrode shape of the interface device for beefing up coupling.

FIG. 32 is an explanatory diagram explaining the electrode shape of interface device for beefing up coupling. It is described with reference to the diagram.

As shown in the diagram, it is determined that the distance between the first conductor portion 111 and the electrodes 1211, 1222 is not constant and is expressed by a function such as H(x) with the position x in the direction along the surface of the first conductor portion 111. H(x) is determined to be adequately smooth and not to cause reflection.

It is assumed that the electromagnetic power that runs in the leak region 141 between the first conductor portion 111 and the electrodes 1211, 1222 at the position x is W1 and the electromagnetic power that runs in the interval region 131 between the first conductor portion 111 and the second conductor portion 121 at the position x is W2. The ratio of these:

$$r(x)=W1/W2$$

is given as $$r(x)=h\in_1/(H(x)\in_2)$$

for one of the aforementioned two modes, J2.

Therefore, as shown in the diagram, if the electromagnetic wave travels in the direction where H(x) is liable to decrease, the percentage of energy that runs in the leak region 141 between the first conductor portion 111 and the electrodes 1211, 1222 increases with the wave progress. The electromagnetic wave propagates keeping the value of (a) the voltage between the first conductor portion 111 and the electrodes 1211, 1222 to be equal to (b) the voltage between the first conductor portion 111 and the second conductor portion 121.

Therefore, it is desirable that the first electrode 1211 and the second electrode 1222 are so configured as to allow the distance H(x) from the first conductor portion 111 to be varied smoothly, for example, and to be the shortest near a portion where it is connected to an external device.

Figure 33:
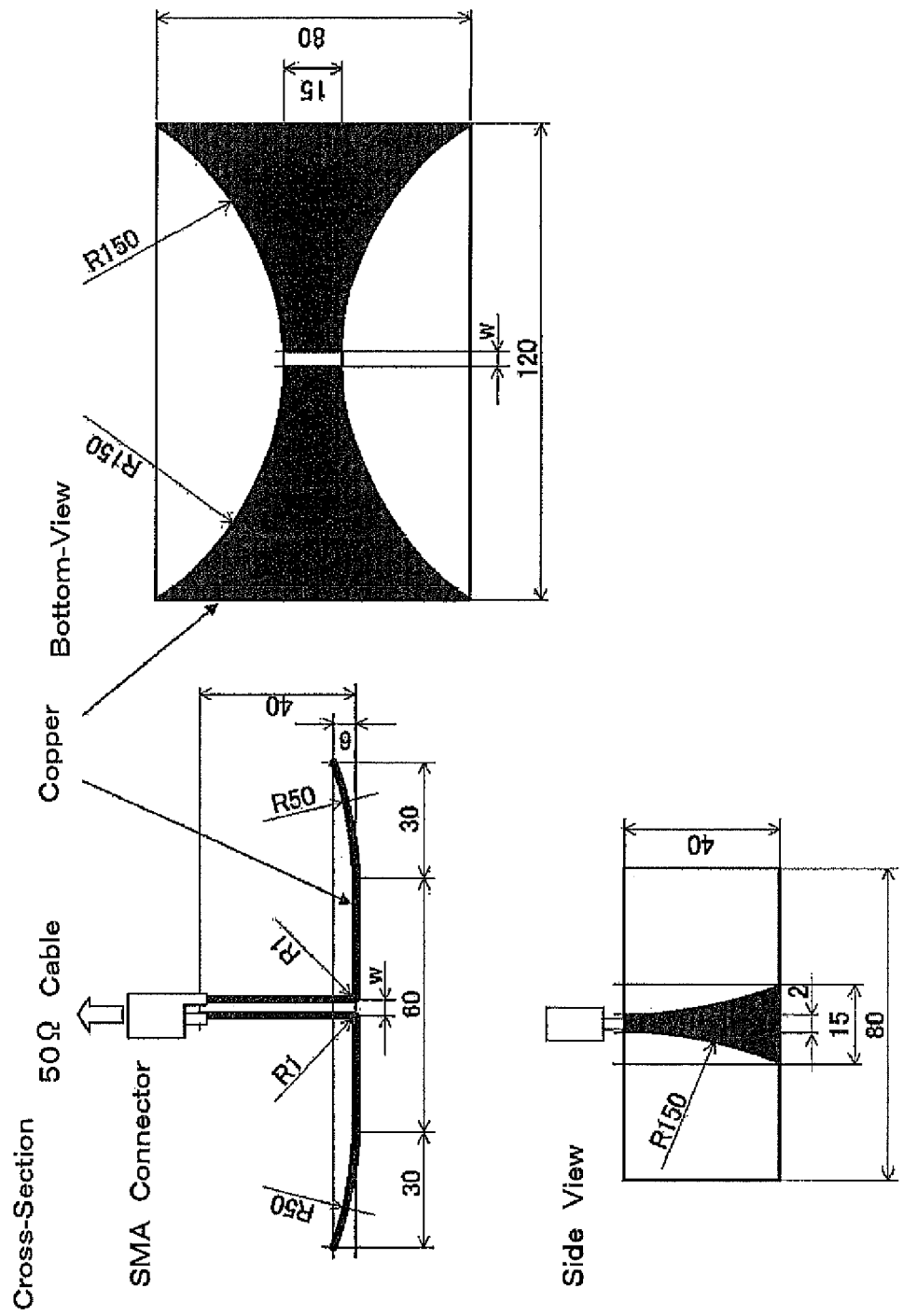
FIG. 33 is an explanatory diagram showing one exemplary specifics of a concrete shape of the interface device.

FIG. 33 is explanatory diagram showing one example of a concrete shape of such an interface device. Below it is described with reference to the diagram. In addition, the symbols referring to each portion are not illustrated because the dimensions of each portion are shown in numerical figures in the diagram.

The interface device 1201 shown in the diagram is configured by bending the first electrode 1211 and the second electrode 1222.

Figure 34:
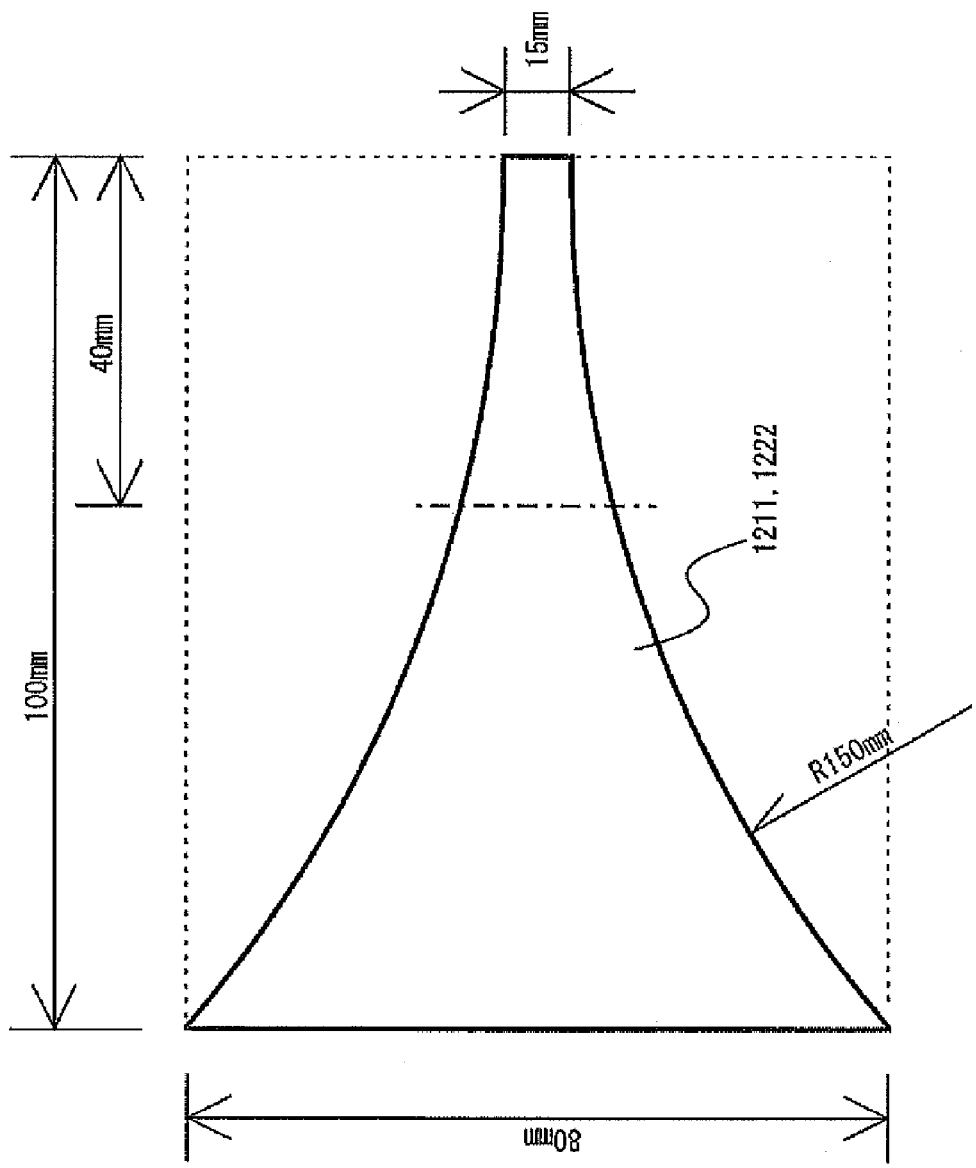
FIG. 34 is a development of a copper plate-made electrode of the interface device.

FIG. 34 is a development of the copper plate-made electrode configuring the first electrode 1211 and the second electrode 1222. It is described with reference to the diagram.

This copper-plate is a shape where two fan-shapes with radius of about 150 mm are removed from a rectangular copper-plate with width of about 80 mm and length of about 100 mm, the fan-shape pass through the apex of one short side (two apexes on the left hand of the rectangle in the diagram) and pass through the point where the points are spaced out by 7.5 mm from the center (the point where the points are spaced out by 15 mm) in the other short side. Around the line about 40 mm from the tapered tip (the chain line in the diagram) it is bent at a right angle with the curvature radius of about 1 mm, and the area up to about 30 mm from the opposite end is rolled smoothly and arcuately at the curvature radius of about 50 mm. The coaxial cable is disposed at the tapered tip through a SMA connector.

The portion of the lower surface of the interface device 1201 is disposed to face the first conductor portion 111, and forms the leak region 141 with the first conductor portion. On the other hand, the portion that is erected at the center of the interface device 1201 (the portion at which the external shape is erected in the side view) functions as a parallel plate waveguide path.

By the way, that the normalized distance $\eta = H\epsilon_2/h\epsilon_1$ is about 1 means $H/\epsilon_1 \approx h/\epsilon_2$.

It is desirable that the same relationship as in this is established even in the portion of the parallel plate waveguide path. Namely, if it is assumed that the distance of the parallel plate wave guide path is W and the dielectric constant of the region between these portions is $\epsilon_3$, $$W/\epsilon_3 \approx H\epsilon_1 \approx h/\epsilon_2$$

should be satisfied.

In other words, the normalized distance of W is:

$$W\epsilon_2/(h\epsilon_3)$$

should be about 1. The dielectric to be filled between the parallel plate waveguide paths may be selected taking into account an application, a cost of raw material and the like.

The electrodes 1211, 1222 of the interface device 1201 are beforehand formed in an arcuated shape of a cross-section as shown in the diagram and the lower surface thereof is located near the first conductor portion 111. Then, if the electromagnetic wave propagates from the left hand of the cross-section, the electromagnetic energy is absorbed between both as the electromagnetic wave approaches the nearest proximity portion of the interface 1201 and the signal carrying apparatus 101.

Therefore, if the parallel plate waveguide path is provided at the nearest proximity portion and is guided to the receiving circuit, the signal is received. On the contrary, if the electromagnetic wave is transmitted from the transmitting circuit through the parallel plate waveguide path, the signal can be transmitted to the signal carrying apparatus 101 so as to allow the signal to be divided to the right/left hands from the nearest proximity portion.

FIG. 35 is explanatory diagram showing the data of the experiment in the communication performance of the signal carrying apparatus 101 and the interface device 1201. It is described with reference to the diagram.

As shown in the diagram, the two interface devices 1201 each including the proximity connectors are put on the signal carrying apparatus 101 (refer to the data at the upper right in the diagram) including the meshed communication sheet (refer to the left hand in the diagram. The white rectangle is the interface device 1201 and the hatched pattern is the signal carrying apparatus 101), both are each connected to the network analyzer through the coaxial cable, and the distance R between the interface devices 1201 is varied to measure the transit coefficient S12 in this case.

In the diagram, the first conductor portion 111 is formed of the conductive print, the second conductor portion 121 is formed of the conductive cloth, and the dielectric layer base material is disposed in the interval region 131 to form the dielectric layer. In addition, the honeycomb plate in Experiment 2 is of a structure such that square columnar hollow plastic bars with one side of 4 mm are arranged.

Figure 36:
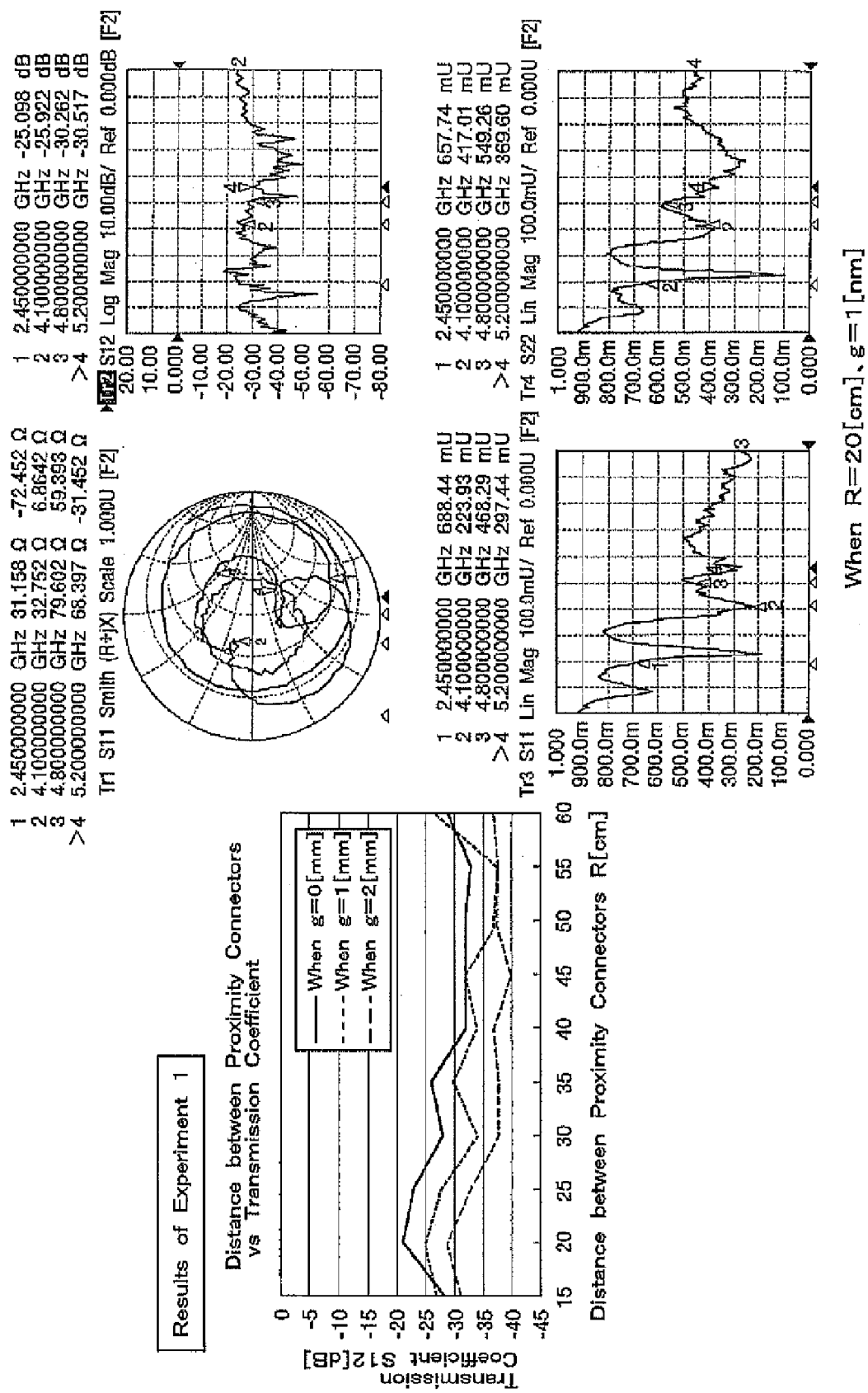
FIG. 36 is a group of graphs showing the results of the experiment in communication performance.

FIG. 36 is a group of the graphs showing the results of the aforementioned communication performance. It is described with reference to the diagram.

In the diagram, the measurement results of S12 in 3.45 GHz (the ratio of the electric power that reaches the other interface device 1201 to the electric power inputted in one interface device 1201) are shown.

The g means the shortest distance between the interface device 1201 and the signal carrying apparatus 101, and the results that the measurements are conducted in three ways of g=0 mm, 1 mm, and 2 mm are shown on the left hand in the diagram. It is understood that if the shortest distance is fluctuated in a scope of g=0 mm to about 1 mm, S12 is almost −30 dB or higher, and an excellent coupling is realized.

On the right hand in the diagram, the measured S parameters of S11, S12, and S22 to the specific R, g in various communication frequency bands are shown. S12 indicates that the results are almost −30 dB or higher from 1 GHz band (the left hand in the graph) to 8.5 GHz (the right hand in the graph) to understand that broadband communications can be realized.

In addition, as shown in FIG. 26, the distances to the first conductor portion 111 of the first electrode 1211 and the second electrode 1222 may be equal to or be different from each other. In addition, if at least either of the first electrode 1211 and the second electrode 1222 meets the conditions of the normalized reactance and the normalized distance such as aforementioned, communications are possible.

In the aforementioned description, the case that the signal carrying apparatus 101 mainly has the meshed first conductor portion 111 with inductive reactance is described. However, the case that the signal carrying apparatus has capacitive reactance so as to allow conductive fine particles to be dispersed and disposed in the dielectric is described below.

First, such a structure of the signal carrying apparatus 101 is referred to. The simplest way is such that a sheet dielectric of high dielectric constant is prepared and metallic fine particles are mixed in the vicinity of the surface of one side thereof. A metallic foil may be affixed onto the other surface or the metallic fine particles may be mixed in the vicinity of the other surface.

If so prepared, the sheet-like dielectric is such that one surface (one surface region where the metallic fine particles are mixed) is the first conductor portion 111, the other surface (the other surface where the metallic foil is affixed or the metallic fine particles are mixed) is the second conductor portion 121, and the interval region 131 therebetween is the dielectric.

The absolute value of the normalized sheet reactance needs to be not extremely smaller than 1 in this case also. However, the following condition that is automatically met in the case of inductance needs to be established:

$$k_1{}^2 = (\mu_2 \in_2 - \mu_1 \in_1)\omega^2 + X\in_2\omega/h > 0$$

In this case, both k and $k_1$ are actual numbers, evanescent field traveling along a sheet-like shape is formed.

By the way, irrespective of a fact that sheet reactance is whether inductive or capacitive, the actual distance H corresponding to the same normalized distance is inversely proportional to dielectric constant $\in_2$ of a dielectric filled in the interval region 131. In addition, in most cases, dielectric constant $\in_1$ outside the signal carrying apparatus 101 is the dielectric constant of the air, and is mostly the constant. Therefore, it is desirable that dielectric constant $\in_2$ is as small as possible to minimize the thickness of the signal carrying apparatus 101.

On the contrary, generally, the dielectric constant of a solid material is bigger than that of the air. Then, if porous materials such as materials containing the air are filled in the interval region 131, dielectric constant $\in_2$ can be minimized to thin the signal carrying apparatus 101.

Embodiment 2

The signal carrying apparatus 101 according to the present invention of the patent application allows communications to be performed even in combination with other than the aforementioned interface device 1201. The aforementioned interface device 1201 has an anisotropic shape so as to allow the electromagnetic wave that is not so broaden in the y axis direction to propagate in the x axis direction. However, an isotropical interface can be also adopted and it is possible communicate with a conductive antenna.

The electromagnetic wave attenuates proportional to exp($-k_1 z$) on the surface of the signal carrying apparatus 101 in the case where the surface of the signal carrying apparatus is open. Here, as aforementioned, $$k_1 = [(\mu_2 \in_2 - \mu_1 \in_1)\omega^2 + \in_2 \omega/h]1/2.$$

This is an approximation supposing $$k_1 h \ll 1.$$

The attenuated distance L can be expressed as:

$$L = 1/k_1.$$

The attenuated distance is typically about several centimeters. Therefore, if an antenna is installed at such a height or closer thereto, the antenna detects the electromagnetic wave propagating in the signal carrying apparatus 101, thereby enabling the system to receive the signal.

If the normalized sheet reactance is about 1, L in most cases is almost the same order as in the electromagnetic wavelength $\lambda$ (more accurately, $\lambda/(2\pi)$) propagating in the surface direction of the signal carrying apparatus 101. However, if the dielectric constant of the interval region 131 and that of the leak region 141 are equal, L may be different from this.

The wave number k of the electromagnetic wave propagating in the surface direction can be generally expressed as below:

$$k_2{}^2 = \mu_2 \in_2 \omega^2 - k_2{}^2 = \mu_2 \in_2 \omega^2 - j\sigma \in_2 \omega/h.$$

Figure 37:
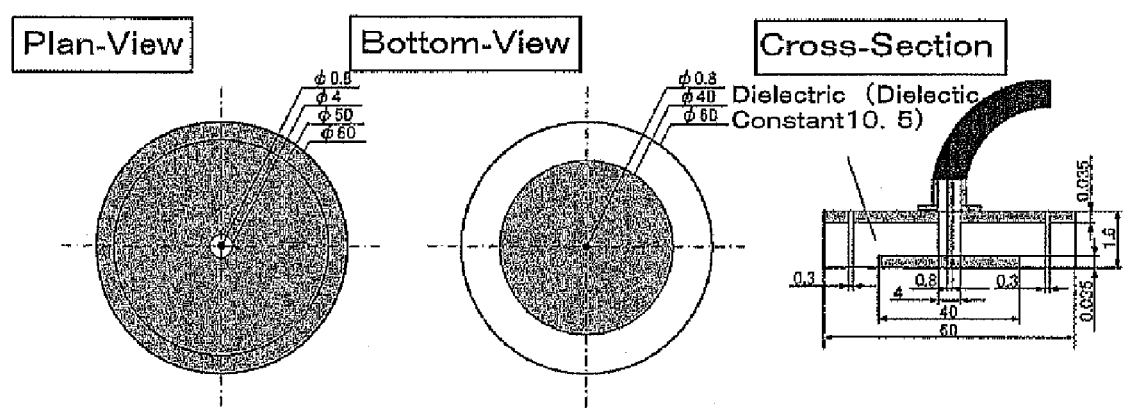
FIG. 37 is an explanatory diagram showing a schematic configuration of an isotropic interface device used in an experiment.

By the way, the following experiment is conducted on the performance of the signal carrying apparatus 101 to such an antenna and isotropical interface. FIG. 37 is an explanatory diagram showing a schematic configuration of the isotropical interface device used for the experiment. It is described with reference to the diagram.

The isotropical interface device shown in the diagram is similar to the interface device shown in FIG. 26(c), and the unit of a numerical value indicating the length shown in the diagram is mm.

Figure 38:
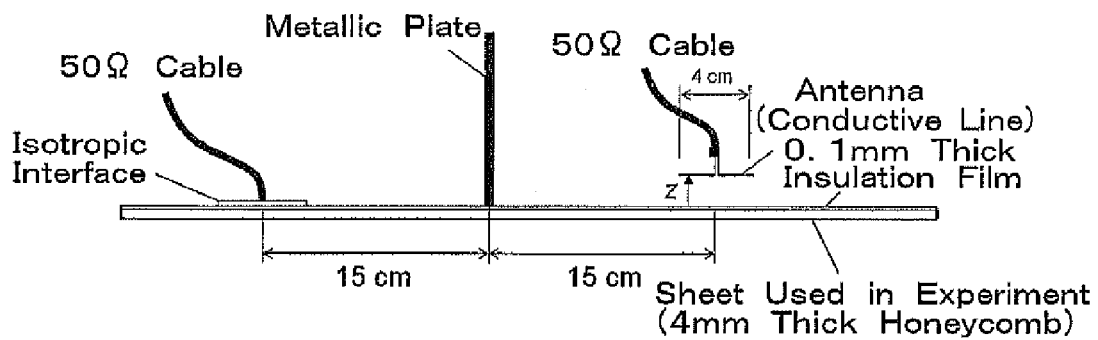
FIG. 38 is an explanatory diagram showing dispositions of the isotropic interface device, signal carrying apparatus, and a conductive antenna in an experiment.

FIG. 38 is an explanatory diagram showing the layouts of the isotropical interface device, the signal carrying apparatus 101, and the conductive antenna in the experiment.

As shown in the diagram, an insulating film with thickness of 0.1 mm is affixed onto the surface of the signal carrying apparatus 101 in Experiment 2 (honeycomb plate) shown in FIG. 35. Therefore, if the isotropical interface device is closely contacted with the insulating film, H=about 0.1 mm.

The conductive antenna is of the total length of 4 cm by disposing two conductive wires of 2 cm on the same straight line, and a 50Ω cable is connected thereto.

A metal plate is disposed between both. The plate is for shielding modes other than evanescent waves in conducting the experiment.

Figure 39:
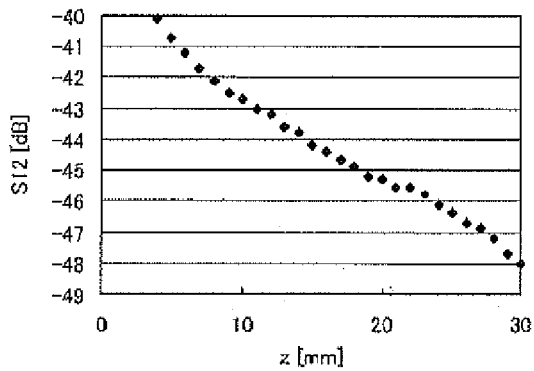
FIG. 39 is a graph showing signal carrying performance between the isotropic interface and conductive antenna.

FIG. 39 is a graph showing signal carrying performance between the isotropical interface device and the conductive antenna. It is described with reference to the diagram below.

As shown in the diagram, the reception sensitivity of the conductive antenna exponentially attenuates to the distance z from the signal carrying apparatus 101. However, it is understood that if the conductive antenna is used as a reception-side dedicated one, reception in practical sensitivity is possible.

In addition, it is desirable that the electromagnetic energy does not go out of the signal carrying apparatus 101 unless necessary. Therefore, it is determined to be designed such that energy is absorbed only when an electrode is being put close thereto. However, for this purpose, the size of X needn't to be extremely too big. Therefore, if a signal that is transmitted through the signal carrying apparatus 101 is sensed with the conductive, the upper limit of X may be reversely set from the conditions of the disposition position and sensitivity of the conductive antenna.

Figure 40:
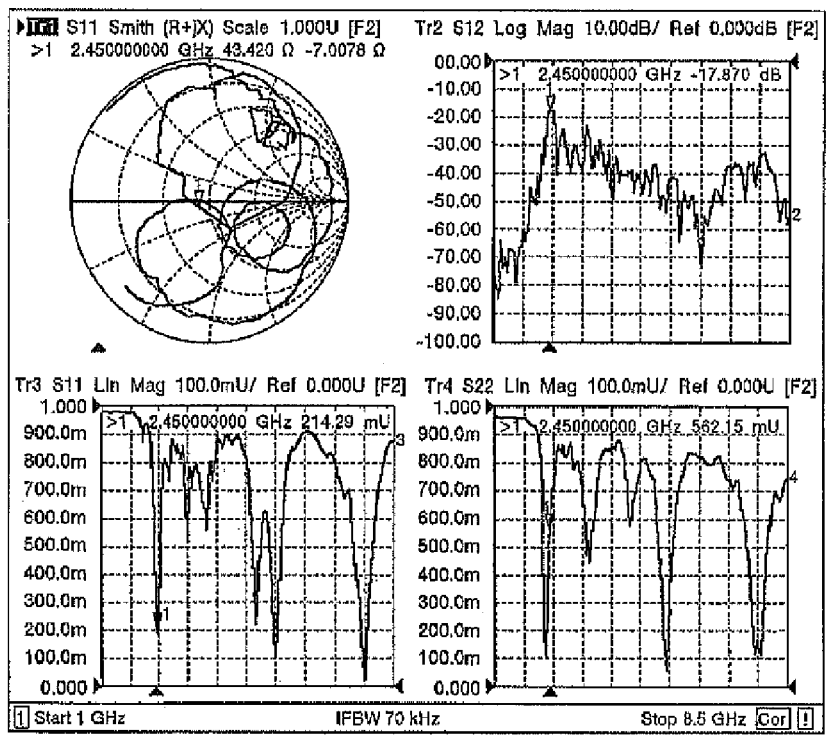
FIG. 40 is a graph showing the investigation results of the signal carrying performance in 1 GHz to 8.5 GHz bands in the case where the isotropic devices are spaced out by 30 cm and they are both closely contacted with the signal carrying apparatus.

FIG. 40 is a graph showing the investigation results of signal carrying performance in 1 GHz to 8.5 GHz by allowing the isotropical interface devices spaced out by 30 cm to be contacted with the signal carrying apparatus 101.

The diagram shows S12 measured with the network analyzer. In 2.4 GHz band, S12=20 dB, it is understood that communications in practical sensitivity is possible even if such an isotropical interface device is used. In addition, the frequency in which the experiment is conducted is 2.4 GHz, and the resonance frequency of the antenna is intentionally set at 4.1 GHz higher than the former.

INDUSTRIAL APPLICABILITY

As stated above, the present invention can provide the communication system, interface device, and signal carrying apparatus having a sheet-like shape, wherein electrodes of the interface device are put noncontactly near the signal carrying apparatus in order to efficiently carry a signal.

The invention claimed is:

1. A communication system comprising:
a sheet-like signal carrying apparatus (101) for carrying a signal by variation of an electromagnetic field; and an interface device for carrying a signal between the interface device and the signal carrying apparatus (101), wherein
(a) the signal carrying apparatus (101) includes:
a first conductor portion (111) of which an external shape is sheet-like and which serves as a conductor in a frequency band $\omega/(2\pi)$ of the electromagnetic field; and
a second conductor portion (121) of which an external shape is sheet-like and which serves as a conductor in the frequency band $\omega/(2\pi)$ of the electromagnetic field and arranged substantially in parallel with the first conductor portion (111) and spaced from the first conductor portion (111) by a distance h;
(b) the interface device (1201) includes:
a first electrode (1211) having a surface located near the first conductor portion (111) and
a second electrode (1222) having a surface located near the first conductor portion (111) and disposed at a position different from that where the first electrode (1211) is located; and
(c) wherein for normalized sheet reactance $\gamma$ defined as $\gamma = X\in_2/[h\omega(\in_2\mu_2 - \in_1\mu_1)]$,
normalized distance $\eta$ defined as $\eta = H\in_2/(h\in_1)$ to a distance H between at least one of the electrodes (1211, 1222) and the first conductor portion (111),
wherein dielectric constant $\in_2$ of an interval region (131) between the first conductor portion (111) and the second conductor portion (1222)
magnetic permeability $\mu_2$ of the interval region (131),
reactance component X of sheet impedance $\sigma = E_x/I_x = r + jX$ which is the ratio of electric field $E_x$ in the surface expansion direction of the first conductor portion (111) on the surface thereof to current density $I_x$,
dielectric constant $\in_1$ of the leak region (141) between at least one electrode out of the first electrode (1211) and the second electrode (1222) and the first conductor portion (111) and
magnetic permeability $\mu_1$ of the leak region (141),
an electromagnetic wave is carried in a surface expansion direction of the first conductor portion (111) in the leak region (141) and the interval region (131) due to the disposition of the interface device (1201) and the signal carrying apparatus (101) with respect to each other so that the normalized distance $\eta$ is smaller than a maximum normalized distance $\eta_{max}$ which is the upper limit value of the normalized distance $\eta$ defined for a desired efficiency of electromagnetic energy absorption and the normalized sheet reactance $\gamma$.

2. The communication system (111) according to claim 1, wherein the region located near at least one electrode of the electrodes of the first conductor portion (111) is such that the spatial distribution of the conductor is uneven.

3. The communication system (111) according to claim 2, wherein the first conductor portion (111) comprises a meshed conductor.

4. The communication system (111) according to claim 2, wherein the first conductor portion (111) comprises a conductive thin film of irregularity/corrugated shape.

5. The communication system (111) according to claim 2, wherein the first conductor portion (111) comprises a cloth-like woven conductive fiber.

6. The communication system (111) according to claim 2, wherein a dielectric is filled in the interval region (131) and the first conductor portion (111) is formed by mixing conductive fine particles in the vicinity of the surface of the filled dielectric.

7. The communication system (111) according to claim 1, wherein the second conductor portion (121) comprises the same structure as in the first conductor portion (111).

8. The communication system (111) according to claim 1, wherein a porous dielectric containing the air is filled in the interval region (131).

9. The communication system according to claim 1, wherein
the first electrode (1211) and the second electrode (1222) are substantially L-shaped having a surface extending substantially in a vertical direction with respect to the first conductor portion (111) and a surface extending substantially in a direction almost in parallel with the first conductor portion (111),
the surfaces almost in parallel with extending substantially vertical to the first conductor portion (111) of the first electrode (1211) and the second electrode (1222) are in parallel with each other and are mutually opposed and spaced by the distance w, and
dielectric constant $\in_3$ disposed between the surfaces extending substantially in the vertical direction with respect to the first conductor portion (111) of the first electrode (1211) and the second electrode (1222), wherein a normalized distance $\nu = w \in_2/(h\in_3)$ and $\eta$ are almost the same.

10. The communication system according to claim 1, wherein the thickness of the interval region (131) is the same or less than wavelength of the frequency band of the electromagnetic field.

11. The communication system according to claim 1, wherein the second conductor portion (121) is affixed onto the wall of a building, an insulator in the frequency band of the electromagnetic field is disposed so as to cover the second conductor portion (121), and the first conductor portion (111) is affixed onto the disposed insulator.

12. The communication system according to claim 1, wherein the second conductor portion (121) is a conductor comprising the hull of a vehicle, the insulator in the frequency band of the electromagnetic field is disposed so as to cover the inside of the second conductor portion (121), and the first conductor portion (111) is affixed onto the disposed insulator.

13. An interface device (1201) in the communication system according to claim 1.

14. A sheet-like signal carrying apparatus (101) for carrying a signal by variation of electromagnetic field between the signal carrying apparatus and an interface device, comprising:
a first conductor portion (111) of which external shape is sheet-like and which serves as a conductor in the frequency band $\omega/(2\pi)$ of the electromagnetic field; and a second conductor portion (121) of which external shape is sheet-like and which serves as a conductor in the frequency band ω/(2π) of the electromagnetic field and arranged substantially in parallel with the first conductor portion (111) by being spaced out by a distance h; and wherein for normalized sheet reactance γ defined as $\gamma = X\in_2/[h\omega(\in_2\mu_2 - \in_1\mu_1)]$, normalized distance η defined as $\eta = H\in_2/(h\in_1)$ for a distance H between the interface device and the first conductor portion (111), dielectric constant $\in_2$ of an interval region (131) between the first conductor portion (111) and the second conductor portion (121)

magnetic permeability $\mu_2$ of the interval region (131), reactance component X is of sheet impedance $\sigma = E_x/I_x = r + jX$ which is the ratio of electric field $E_x$ in a surface expansion direction of the first conductor portion (111) on the surface thereof for current density $I_x$, dielectric constant $\in_1$ of the of a leak region (141) between the interface device and the first conductor portion (111) and magnetic permeability $\mu_1$ of the leak region (141), and the electromagnetic wave is carried in the surface expansion direction of the first conductor portion (111) in the leak region (141) and the interval region (131), by putting the interface device (1201) and the signal carrying apparatus (101) closer to each other so that the normalized distance η is smaller than a maximum normalized distance $\eta_{max}$ which is the upper limit value of the normalized distance $\eta_{max}$ defined for a desired efficiency of electromagnetic energy absorption and the normalized sheet reactance γ.

15. The signal carrying apparatus (101) according to claim 14, further comprising an electrode located near a region in the first conductor portion (111) where the spatial distribution of a conductor in the region is uneven and an absolute value of the normalized sheet reactance y is not extremely smaller than 1.

16. The signal carrying apparatus (101) according to claim 14, wherein the first conductor portion (111) comprises a meshed conductor.

17. The signal carrying apparatus (101) according to claim 14, wherein the first conductor portion (111) comprises a conductor thin film of irregularity/corrugated shape.

18. The signal carrying apparatus (101) according to claim 14, wherein the first conductor portion (111) comprises a cloth-like woven conductor fiber.

19. The signal carrying apparatus (101) according to claim 14, wherein a dielectric is filled in the interval region (131) and the first conductor portion (111) is formed by mixing conductive fine particles in the vicinity of the surface of the filled dielectric.

20. The signal carrying apparatus (101) according to claim 14, wherein the second conductor portion (121) comprises the same structure as in the first conductor portion (111).

21. The signal carrying apparatus (101) according to claim 14, wherein a porous dielectric containing the air is filled in the interval region (131).

22. The signal carrying apparatus (101) according to claim 14, wherein the second conductor (121) is affixed onto the wall of a building and an insulator in the frequency band of the electromagnetic field, an insulator in the frequency band of the electromagnetic field is disposed so as to cover the inside of the second conductor portion (121), and the first conductor portion (111) is affixed onto the disposed insulator.

23. The signal carrying apparatus (101) according to claim 14, wherein the second conductor (121) is a conductor comprising the hull of a vehicle, an insulator in the frequency band of the electromagnetic field is disposed so as to cover the inside of the second conductor portion (121), and the first conductor portion (111) is affixed onto the disposed insulator.

24. A communication system comprising the signal carrying apparatus (101) according to claim 14, and an antenna for receiving the signal transmitted by the signal carrying apparatus (101), wherein the conductive antenna is disposed closer to a distance from the first conductor (111) of the signal carrying apparatus (101) which is not an extremely longer distance than the attenuation distance L defined by $L = ([\mu_2\in_2 - \mu_1\in_1\omega^2 + X\in_2\omega/h]^{-1/2}$.

25. The communication system according to claim 24, wherein a signal transmitted by the signal carrying apparatus (101) is supplied from a cable connected in wired connection to the first conductor portion (111) and the second conductor (121) in the signal carrying apparatus (101).

* * * * *

UNITED STATES PATENT AND TRADEMARK OFFICE
CERTIFICATE OF CORRECTION

PATENT NO. : 7,724,203 B2
APPLICATION NO. : 12/066541
DATED : May 25, 2010
INVENTOR(S) : Hiroyuki Shinoda et al.

It is certified that error appears in the above-identified patent and that said Letters Patent is hereby corrected as shown below:

Column 2, Lines 47-48, delete "$\gamma = X\varepsilon 2/[h\omega(\mu 2\mu 2 - \varepsilon 1\varepsilon 1)]$" and add -- $\gamma = X\varepsilon 2/[h\omega(\varepsilon 2\mu 2 - \varepsilon 1\mu 1)]$ --.
Column 5, Line 58, delete "((J1+J2)max)" and add -- ((J1+J2)max) --.
Column 8, Line 3, delete "able to coupled" and add -- able to be coupled --.
Column 8, Line 46, delete "201. where" and add -- 201. Where --.
Column 16, Line 46, delete "These means" and add -- This means --.
Column 17, Line 31, delete "the interface" and add -- The interface --.
Column 28, Line 12, delete "FIG. 35 is explanatory" and add -- FIG. 35 is an explanatory --.
Column 29, Line 39, delete "Embodiment 2" and add -- [Embodiment 2] --.
Claim 1 at Column 31, Line 37, delete "$\gamma = X\varepsilon 2/[h\omega(\varepsilon 2\mu 2 - \varepsilon 1\mu 1]$" and add
-- $\gamma = X\varepsilon 2/[h\omega(\varepsilon 2\mu 2 - \varepsilon 1\mu 1)]$ --.
Claim 1 at Column 31, Line 41, delete "wherein dielectric" and add -- dielectric --.
Claim 9 at Column 32, Line 31, delete "the surfaces almost in parallel with extending" and add
-- the surfaces extending --.
Claim 9 at Column 32, Line 44, delete "or less than wavelength" and add
-- or less than the wavelength --.
Claim 14 at Column 33, Line 6, delete "wherein for" and add -- wherein, for --.
Claim 14 at Column 33, Line 7, delete "$\gamma = X\varepsilon 2/[h\omega(\varepsilon 2\mu 2 - \varepsilon 1\mu 1]$" and add
-- $\gamma = X\varepsilon 2/[h\omega(\varepsilon 2\mu 2 - \varepsilon 1\mu 1)]$ --.
Claim 14 at Column 33, Line 19, delete "dielectric constant $\varepsilon 1$ of the of a leak region" and add
-- dielectric constant $\varepsilon 1$ of a leak region --.
Claim 14 at Column 33, Line 30, delete " distance $\eta$max defined" and add -- distance $\eta$ defined --.
Claim 15 at Column 33, Line 37, delete "reactance y" and add -- reactance reactance $\gamma$ --.
Claim 24 at Column 34, Line 37, delete "$L=([\mu 2\varepsilon 2 - \mu 1\varepsilon 1\omega 2 + X\varepsilon 2\omega/h] -1/2$" and add
-- $L=[(\mu 2\varepsilon 2 - \mu 1\varepsilon 1)\omega 2 + X\varepsilon 2\omega/h] -1/2$ --.

Signed and Sealed this
Tenth Day of July, 2012

David J. Kappos
*Director of the United States Patent and Trademark Office*